United States Patent
Choi et al.

(10) Patent No.: US 12,410,369 B2
(45) Date of Patent: Sep. 9, 2025

(54) FLAT PUSH HOT CAR FOR FOUNDRY COKE AND ASSOCIATED SYSTEMS AND METHODS

(71) Applicant: SUNCOKE TECHNOLOGY AND DEVELOPMENT LLC, Lisle, IL (US)

(72) Inventors: Chun Wai Choi, Chicago, IL (US); John Francis Quanci, Haddonfield, NJ (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

(21) Appl. No.: 18/954,882

(22) Filed: Nov. 21, 2024

(65) Prior Publication Data

US 2025/0163329 A1     May 22, 2025

Related U.S. Application Data

(60) Provisional application No. 63/601,490, filed on Nov. 21, 2023.

(51) Int. Cl.
*B01D 50/20*     (2022.01)
*C10B 33/00*     (2006.01)
(Continued)

(52) U.S. Cl.
CPC .............. *C10B 43/14* (2013.01); *B01D 50/20* (2022.01); *C10B 33/00* (2013.01); *C10B 39/14* (2013.01);
(Continued)

(58) Field of Classification Search
None
See application file for complete search history.

(56) References Cited

U.S. PATENT DOCUMENTS

| 425,797 A | 4/1890 | Hunt |
| 469,868 A | 3/1892 | Osbourn |

(Continued)

FOREIGN PATENT DOCUMENTS

| CA | 1172895 | 8/1984 |
| CA | 2775992 | 5/2011 |

(Continued)

OTHER PUBLICATIONS

U.S. Appl. No. 18/770,274, filed Jul. 11, 2024, Quanci et al.
(Continued)

*Primary Examiner* — Dung H Bui
(74) *Attorney, Agent, or Firm* — Perkins Coie LLP; Vijay S. Kumar

(57) ABSTRACT

Industrial cars for holding high-temperature materials, such as flat push hot cars for transporting hot coke and deposits, and associated systems and methods are disclosed herein. In some embodiments, an industrial car can include an at least partially enclosed hot box with a base and sidewalls, and one or more of the base or sidewalls can be covered by surface plates. The surface plates can be arranged in a floating configuration with gaps therebetween, such that the surface plates can move relative to one another and thermally expand without exerting excessive compressive force against adjacent surface plates. In some embodiments, the hot box can also include a roof with a first non-curved member and a second non-curved member abutting the first non-curved member. In some embodiments, the industrial car can include one or more emission ducts to remove dust and exhaust from within and around the industrial car.

9 Claims, 12 Drawing Sheets

(51) Int. Cl.
*C10B 39/14* (2006.01)
*C10B 43/14* (2006.01)
*F27D 15/00* (2006.01)
*F27D 17/30* (2025.01)
*F27D 17/25* (2025.01)

(52) U.S. Cl.
CPC ............ *F27D 15/00* (2013.01); *F27D 17/30* (2025.01); *F27D 17/25* (2025.01)

(56) References Cited

U.S. PATENT DOCUMENTS

| | | |
|---|---|---|
| 705,926 A | 7/1902 | Hemingway |
| 760,372 A | 5/1904 | Beam |
| 845,719 A | 2/1907 | Schniewind |
| 875,989 A | 1/1908 | Garner |
| 976,580 A | 11/1910 | Krause |
| 1,140,798 A | 5/1915 | Carpenter |
| 1,378,782 A | 5/1921 | Griffin |
| 1,424,777 A | 8/1922 | Schondeling |
| 1,429,346 A | 9/1922 | Horn |
| 1,430,027 A | 9/1922 | Plantinga |
| 1,486,401 A | 3/1924 | Van Ackeren |
| 1,530,995 A | 3/1925 | Geiger |
| 1,572,391 A | 2/1926 | Klaiber |
| 1,677,973 A | 7/1928 | Marquard |
| 1,705,039 A | 3/1929 | Thornhill |
| 1,721,813 A | 7/1929 | Geipert |
| 1,757,682 A | 5/1930 | Palm |
| 1,818,370 A | 8/1931 | Wine |
| 1,818,994 A | 8/1931 | Kreisinger |
| 1,830,951 A | 11/1931 | Lovett |
| 1,848,818 A | 3/1932 | Becker |
| 1,895,202 A | 1/1933 | Montgomery |
| 1,947,499 A | 2/1934 | Schrader et al. |
| 1,955,962 A | 4/1934 | Jones |
| 1,979,507 A | 11/1934 | Underwood |
| 2,075,337 A | 3/1937 | Burnaugh |
| 2,141,035 A | 12/1938 | Daniels |
| 2,195,466 A | 4/1940 | Otto |
| 2,235,970 A | 3/1941 | Wilputte |
| 2,340,283 A | 1/1944 | Vladu |
| 2,340,981 A | 2/1944 | Otto |
| 2,343,034 A | 2/1944 | Weber |
| 2,394,173 A | 2/1946 | Harris et al. |
| 2,424,012 A | 7/1947 | Bangham et al. |
| 2,486,199 A | 10/1949 | Nier |
| 2,609,948 A | 9/1952 | Laveley |
| 2,641,575 A | 6/1953 | Otto |
| 2,649,978 A | 8/1953 | Smith |
| 2,667,185 A | 1/1954 | Beavers |
| 2,723,725 A | 11/1955 | Keiffer |
| 2,756,842 A | 7/1956 | Chamberlin et al. |
| 2,765,266 A | 10/1956 | Throop et al. |
| 2,813,708 A | 11/1957 | Frey |
| 2,827,424 A | 3/1958 | Homan |
| 2,873,816 A | 2/1959 | Emil et al. |
| 2,902,991 A | 9/1959 | Whitman |
| 2,907,698 A | 10/1959 | Schulz |
| 2,968,083 A | 1/1961 | Lentz et al. |
| 3,010,882 A | 11/1961 | Barclay et al. |
| 3,015,893 A | 1/1962 | McCreary |
| 3,026,715 A | 3/1962 | Briggs |
| 3,033,764 A | 5/1962 | Hannes |
| 3,085,582 A | 4/1963 | Slosman |
| 3,175,961 A | 3/1965 | Samson |
| 3,199,135 A | 8/1965 | Trucker |
| 3,224,805 A | 12/1965 | Clyatt |
| 3,259,551 A | 7/1966 | Thompson, Jr. |
| 3,265,044 A | 8/1966 | Juchtern |
| 3,267,913 A | 8/1966 | Jakob |
| 3,327,521 A | 6/1967 | Briggs |
| 3,342,990 A | 9/1967 | Barrington et al. |
| 3,444,046 A | 5/1969 | Harlow |
| 3,444,047 A | 5/1969 | Wilde |
| 3,448,012 A | 6/1969 | Allred |
| 3,453,839 A | 7/1969 | Sabin |
| 3,462,345 A | 8/1969 | Kernan |
| 3,462,346 A | 8/1969 | Kernan et al. |
| 3,511,030 A | 5/1970 | Brown et al. |
| 3,542,650 A | 11/1970 | Kulakov |
| 3,545,470 A | 12/1970 | Paton |
| 3,587,198 A | 6/1971 | Hensel |
| 3,591,827 A | 7/1971 | Hall |
| 3,592,742 A | 7/1971 | Thompson |
| 3,616,408 A | 10/1971 | Hickam |
| 3,623,511 A | 11/1971 | Levin |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,710,551 A | 1/1973 | Sved |
| 3,746,626 A | 7/1973 | Morrison, Jr. |
| 3,748,235 A | 7/1973 | Pries |
| 3,784,034 A | 1/1974 | Thompson |
| 3,788,236 A | 1/1974 | Edgar et al. |
| 3,806,032 A | 4/1974 | Pries |
| 3,811,572 A | 5/1974 | Tatterson |
| 3,836,161 A | 9/1974 | Buhl |
| 3,839,156 A | 10/1974 | Jakobi et al. |
| 3,844,900 A | 10/1974 | Schulte |
| 3,857,758 A | 12/1974 | Mole |
| 3,868,309 A | 2/1975 | Sustarsic et al. |
| 3,875,016 A | 4/1975 | Schmidt-Balve |
| 3,876,143 A | 4/1975 | Rossow et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,897,313 A | 7/1975 | Ibaragi et al. |
| 3,906,992 A | 9/1975 | Leach |
| 3,912,091 A | 10/1975 | Thompson |
| 3,912,597 A | 10/1975 | MacDonald |
| 3,917,458 A | 11/1975 | Polak |
| 3,928,144 A | 12/1975 | Jakimowicz |
| 3,930,961 A | 1/1976 | Sustarsic et al. |
| 3,933,443 A | 1/1976 | Lohrmann |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach |
| 3,975,148 A | 8/1976 | Fukuda et al. |
| 3,979,870 A | 9/1976 | Moore |
| 3,984,289 A | 10/1976 | Sustarsic et al. |
| 3,990,948 A | 11/1976 | Lindgren |
| 4,004,702 A | 1/1977 | Szendroi |
| 4,004,983 A | 1/1977 | Pries |
| 4,010,695 A | 3/1977 | Mantione |
| 4,019,963 A | 4/1977 | Hanley, Jr. |
| 4,025,395 A | 5/1977 | Ekholm et al. |
| 4,040,910 A | 8/1977 | Knappstein et al. |
| 4,045,056 A | 8/1977 | Kandakov et al. |
| 4,045,299 A | 8/1977 | McDonald |
| 4,059,885 A | 11/1977 | Oldengott |
| 4,065,059 A | 12/1977 | Jablin |
| 4,067,462 A | 1/1978 | Thompson |
| 4,077,848 A | 3/1978 | Grainer et al. |
| 4,083,753 A * | 4/1978 | Rogers ............... C10B 39/14 105/235 |
| 4,086,231 A | 4/1978 | Ikio |
| 4,093,245 A | 6/1978 | Connor |
| 4,100,033 A | 7/1978 | Holter |
| 4,100,491 A | 7/1978 | Newman, Jr. et al. |
| 4,100,889 A | 7/1978 | Chayes |
| 4,111,757 A | 9/1978 | Carimboli |
| 4,124,450 A | 11/1978 | MacDonald |
| 4,131,070 A | 12/1978 | Jonnet |
| 4,133,720 A | 1/1979 | Franzer et al. |
| 4,135,948 A | 1/1979 | Mertens et al. |
| 4,135,986 A | 1/1979 | Cain et al. |
| 4,141,299 A | 2/1979 | Friend et al. |
| 4,141,796 A * | 2/1979 | Clark ............... C10B 33/003 105/271 |
| 4,143,104 A | 3/1979 | van Konijnenburg et al. |

(56) References Cited

U.S. PATENT DOCUMENTS

| | | | |
|---|---|---|---|
| 4,145,195 A | 3/1979 | Knappstein et al. | |
| 4,147,230 A | 4/1979 | Ormond et al. | |
| 4,162,546 A | 7/1979 | Shortell et al. | |
| 4,176,013 A | 11/1979 | Garthus et al. | |
| 4,181,459 A | 1/1980 | Price | |
| 4,189,272 A | 2/1980 | Gregor et al. | |
| 4,194,951 A * | 3/1980 | Pries | C10B 39/14 202/227 |
| 4,196,053 A * | 4/1980 | Grohmann | C10B 33/00 414/152 |
| 4,196,054 A | 4/1980 | Becker, Jr. et al. | |
| 4,211,608 A | 7/1980 | Kwasnoski et al. | |
| 4,211,611 A | 7/1980 | Bocsanczy | |
| 4,213,489 A * | 7/1980 | Cain | C10B 39/14 141/70 |
| 4,213,827 A | 7/1980 | Calderon | |
| 4,213,828 A * | 7/1980 | Calderon | C10B 39/04 202/253 |
| 4,222,748 A | 9/1980 | Argo et al. | |
| 4,222,824 A | 9/1980 | Flockenhaus et al. | |
| 4,224,109 A | 9/1980 | Flockenhaus et al. | |
| 4,225,393 A | 9/1980 | Gregor et al. | |
| 4,226,113 A | 10/1980 | Pelletier et al. | |
| 4,230,498 A | 10/1980 | Ruecki | |
| 4,235,830 A | 11/1980 | Bennett et al. | |
| 4,239,602 A | 12/1980 | La Bate | |
| 4,248,671 A * | 2/1981 | Belding | C10B 39/14 201/39 |
| 4,249,997 A | 2/1981 | Schmitz | |
| 4,263,099 A | 4/1981 | Porter | |
| 4,268,360 A | 5/1981 | Tsuzuki et al. | |
| 4,271,814 A | 6/1981 | Lister | |
| 4,284,478 A | 8/1981 | Brommel | |
| 4,285,772 A | 8/1981 | Kress | |
| 4,287,024 A | 9/1981 | Thompson | |
| 4,289,479 A | 9/1981 | Johnson | |
| 4,289,584 A | 9/1981 | Chuss et al. | |
| 4,289,585 A | 9/1981 | Wagener et al. | |
| 4,296,938 A | 10/1981 | Offermann et al. | |
| 4,298,497 A | 11/1981 | Colombo | |
| 4,299,666 A | 11/1981 | Ostmann | |
| 4,302,935 A | 12/1981 | Cousimano | |
| 4,303,615 A | 12/1981 | Jarmell et al. | |
| 4,307,673 A | 12/1981 | Caughey | |
| 4,312,711 A | 1/1982 | Brown et al. | |
| 4,312,712 A | 1/1982 | Kwasnik et al. | |
| 4,314,787 A | 2/1982 | Kwasnik et al. | |
| 4,316,435 A | 2/1982 | Nagamatsu et al. | |
| 4,324,568 A | 4/1982 | Wilcox et al. | |
| 4,330,372 A | 5/1982 | Cairns et al. | |
| 4,334,963 A | 6/1982 | Stog | |
| 4,336,107 A | 6/1982 | Irwin | |
| 4,336,843 A | 6/1982 | Petty | |
| 4,340,445 A * | 7/1982 | Kucher | C10B 39/14 202/262 |
| 4,342,195 A | 8/1982 | Lo | |
| 4,344,820 A | 8/1982 | Thompson | |
| 4,344,822 A | 8/1982 | Schwartz et al. | |
| 4,353,189 A | 10/1982 | Thiersch et al. | |
| 4,366,029 A * | 12/1982 | Bixby | B61D 9/02 202/262 |
| 4,373,244 A | 2/1983 | Mertens et al. | |
| 4,375,388 A | 3/1983 | Hara et al. | |
| 4,385,962 A | 5/1983 | Stewen et al. | |
| 4,391,674 A | 7/1983 | Velmin et al. | |
| 4,392,824 A | 7/1983 | Struck et al. | |
| 4,394,217 A | 7/1983 | Holz et al. | |
| 4,395,269 A | 7/1983 | Schuler | |
| 4,396,394 A | 8/1983 | Li et al. | |
| 4,396,461 A | 8/1983 | Neubaum et al. | |
| 4,406,619 A | 9/1983 | Oldengott | |
| 4,407,237 A | 10/1983 | Merritt | |
| 4,421,070 A | 12/1983 | Sullivan | |
| 4,431,484 A | 2/1984 | Weber et al. | |
| 4,439,277 A | 3/1984 | Dix | |
| 4,440,098 A | 4/1984 | Adams | |
| 4,441,892 A | 4/1984 | Schuster | |
| 4,445,977 A | 5/1984 | Husher | |
| 4,446,018 A | 5/1984 | Cerwick | |
| 4,448,541 A | 5/1984 | Lucas | |
| 4,452,749 A | 6/1984 | Kolvek et al. | |
| 4,459,103 A | 7/1984 | Gieskieng | |
| 4,469,446 A | 9/1984 | Goodboy | |
| 4,474,344 A | 10/1984 | Bennett | |
| 4,487,137 A | 12/1984 | Horvat et al. | |
| 4,498,786 A | 2/1985 | Ruscheweyh | |
| 4,506,025 A | 3/1985 | Kleeb et al. | |
| 4,508,539 A | 4/1985 | Nakai | |
| 4,518,461 A | 5/1985 | Gelfand | |
| 4,527,488 A | 7/1985 | Lindgren | |
| 4,529,407 A | 7/1985 | Johnston et al. | |
| 4,564,420 A | 1/1986 | Spindeler et al. | |
| 4,568,424 A | 2/1986 | Bauer | |
| 4,568,426 A | 2/1986 | Orlando | |
| 4,570,670 A | 2/1986 | Johnson | |
| 4,614,567 A | 9/1986 | Stahlherm et al. | |
| 4,643,327 A | 2/1987 | Campbell | |
| 4,645,513 A | 2/1987 | Kubota et al. | |
| 4,655,193 A | 4/1987 | Blacket | |
| 4,655,804 A | 4/1987 | Kercheval et al. | |
| 4,666,675 A | 5/1987 | Parker et al. | |
| 4,680,167 A | 7/1987 | Orlando | |
| 4,681,662 A | 7/1987 | Kutsumura et al. | |
| 4,690,689 A | 9/1987 | Malcosky et al. | |
| 4,704,195 A | 11/1987 | Janicka et al. | |
| 4,720,262 A | 1/1988 | Durr et al. | |
| 4,724,976 A | 2/1988 | Lee | |
| 4,726,465 A * | 2/1988 | Kwasnik | C10B 39/14 202/230 |
| 4,732,652 A | 3/1988 | Durselen et al. | |
| 4,749,446 A | 6/1988 | van Laar et al. | |
| 4,793,981 A | 12/1988 | Doyle et al. | |
| 4,821,473 A | 4/1989 | Cowell | |
| 4,824,614 A | 4/1989 | Jones et al. | |
| 4,889,698 A | 12/1989 | Moller et al. | |
| 4,898,021 A | 2/1990 | Weaver et al. | |
| 4,918,975 A | 4/1990 | Voss | |
| 4,919,170 A | 4/1990 | Kallinich et al. | |
| 4,929,179 A | 5/1990 | Breidenbach et al. | |
| 4,941,824 A | 7/1990 | Holter et al. | |
| 5,013,408 A | 5/1991 | Asai et al. | |
| 5,052,922 A | 10/1991 | Stokman et al. | |
| 5,062,925 A | 11/1991 | Durselen et al. | |
| 5,078,822 A | 1/1992 | Hodges et al. | |
| 5,087,328 A | 2/1992 | Wegerer et al. | |
| 5,114,542 A | 5/1992 | Childress et al. | |
| 5,213,138 A | 5/1993 | Presz | |
| 5,227,106 A | 7/1993 | Kolvek | |
| 5,228,955 A | 7/1993 | Westbrook, III | |
| 5,234,601 A | 8/1993 | Janke et al. | |
| 5,318,671 A | 6/1994 | Pruitt | |
| 5,370,218 A | 12/1994 | Johnson et al. | |
| 5,398,543 A | 3/1995 | Fukushima et al. | |
| 5,423,152 A | 6/1995 | Kolvek | |
| 5,447,606 A | 9/1995 | Pruitt | |
| 5,480,594 A | 1/1996 | Wilkerson et al. | |
| 5,542,650 A | 8/1996 | Abel et al. | |
| 5,597,452 A | 1/1997 | Hippe et al. | |
| 5,603,810 A | 2/1997 | Michler | |
| 5,622,280 A | 4/1997 | Mays et al. | |
| 5,659,110 A | 8/1997 | Herden et al. | |
| 5,670,025 A | 9/1997 | Baird | |
| 5,687,768 A | 11/1997 | Albrecht et al. | |
| 5,705,037 A | 1/1998 | Reinke et al. | |
| 5,715,962 A | 2/1998 | McDonnell | |
| 5,720,855 A | 2/1998 | Baird | |
| 5,745,969 A | 5/1998 | Yamada et al. | |
| 5,752,548 A | 5/1998 | Matsumoto et al. | |
| 5,752,993 A | 5/1998 | Eatough et al. | |
| 5,787,821 A | 8/1998 | Bhat et al. | |
| 5,810,032 A | 9/1998 | Hong et al. | |
| 5,816,210 A | 10/1998 | Yamaguchi | |
| 5,857,308 A | 1/1999 | Dismore et al. | |

(56) References Cited

U.S. PATENT DOCUMENTS

| | | |
|---|---|---|
| 5,881,551 A | 3/1999 | Dang |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A | 12/1999 | Naito et al. |
| 6,003,706 A | 12/1999 | Rosen |
| 6,017,214 A | 1/2000 | Sturgulewski |
| 6,022,112 A | 2/2000 | Isler et al. |
| 6,059,932 A | 5/2000 | Sturgulewski |
| 6,126,910 A | 10/2000 | Wilhelm et al. |
| 6,139,692 A | 10/2000 | Tamura et al. |
| 6,152,668 A | 11/2000 | Knoch |
| 6,156,688 A | 12/2000 | Ando et al. |
| 6,173,679 B1 | 1/2001 | Bruckner et al. |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,424,457 B1 | 7/2002 | Koonmen et al. |
| 6,495,268 B1 | 12/2002 | Harth, III et al. |
| 6,539,602 B1 | 4/2003 | Ozawa et al. |
| 6,596,128 B2 | 7/2003 | Westbrook |
| 6,626,984 B1 | 9/2003 | Taylor |
| 6,699,035 B2 | 3/2004 | Brooker |
| 6,712,576 B2 | 3/2004 | Skarzenski et al. |
| 6,758,875 B2 | 7/2004 | Reid et al. |
| 6,786,941 B2 | 9/2004 | Reeves et al. |
| 6,830,660 B1 | 12/2004 | Yamauchi et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,547,377 B2 | 6/2009 | Inamasu et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,172,930 B2 | 5/2012 | Barkdoll |
| 8,236,142 B2 | 8/2012 | Westbrook |
| 8,266,853 B2 | 9/2012 | Bloom et al. |
| 8,311,777 B2 | 11/2012 | Suguira et al. |
| 8,383,055 B2 | 2/2013 | Palmer |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,568,568 B2 | 10/2013 | Schuecker et al. |
| 8,640,635 B2 | 2/2014 | Bloom et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,169,439 B2 | 10/2015 | Sarpen et al. |
| 9,193,913 B2 | 11/2015 | Quanci et al. |
| 9,193,915 B2 | 11/2015 | West et al. |
| 9,200,225 B2 | 12/2015 | Barkdoll et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,273,250 B2 | 3/2016 | Choi et al. |
| 9,321,965 B2 | 4/2016 | Barkdoll |
| 9,359,554 B2 | 6/2016 | Quanci et al. |
| 9,404,043 B2 | 8/2016 | Kim |
| 9,463,980 B2 | 10/2016 | Fukada et al. |
| 9,476,547 B2 | 10/2016 | Quanci et al. |
| 9,498,786 B2 | 11/2016 | Pearson |
| 9,580,656 B2 | 2/2017 | Quanci et al. |
| 9,672,499 B2 | 6/2017 | Quanci et al. |
| 9,683,740 B2 | 6/2017 | Rodgers et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,392,563 B2 | 8/2019 | Kim et al. |
| 10,435,042 B1 | 10/2019 | Weymouth |
| 10,526,541 B2 | 1/2020 | West et al. |
| 10,526,542 B2 | 1/2020 | Quanci et al. |
| 10,578,521 B1 | 3/2020 | Dinakaran et al. |
| 10,611,965 B2 | 4/2020 | Quanci et al. |
| 10,619,101 B2 | 4/2020 | Quanci et al. |
| 10,732,621 B2 | 8/2020 | Cella et al. |
| 10,760,002 B2 | 9/2020 | Ball et al. |
| 10,851,306 B2 | 12/2020 | Crum et al. |
| 10,877,007 B2 | 12/2020 | Steele et al. |
| 10,883,051 B2 | 1/2021 | Quanci et al. |
| 10,920,148 B2 | 2/2021 | Quanci et al. |
| 10,927,303 B2 | 2/2021 | Choi et al. |
| 10,947,455 B2 | 3/2021 | Quanci et al. |
| 10,968,393 B2 | 4/2021 | West et al. |
| 10,968,395 B2 | 4/2021 | Quanci et al. |
| 10,975,309 B2 | 4/2021 | Quanci et al. |
| 10,975,310 B2 | 4/2021 | Quanci et al. |
| 10,975,311 B2 | 4/2021 | Quanci et al. |
| 11,008,517 B2 | 5/2021 | Chun et al. |
| 11,008,518 B2 | 5/2021 | Quanci et al. |
| 11,021,655 B2 | 6/2021 | Quanci et al. |
| 11,053,444 B2 | 7/2021 | Quanci et al. |
| 11,060,032 B2 | 7/2021 | Quanci et al. |
| 11,071,935 B2 | 7/2021 | Quanci et al. |
| 11,098,252 B2 | 8/2021 | Quanci et al. |
| 11,117,087 B2 | 9/2021 | Quanci |
| 11,142,699 B2 | 10/2021 | West et al. |
| 11,186,778 B2 | 11/2021 | Crum et al. |
| 11,193,069 B2 | 12/2021 | Quanci et al. |
| 11,214,739 B2 | 1/2022 | Quanci et al. |
| 11,261,381 B2 | 3/2022 | Quanci et al. |
| 11,359,145 B2 | 6/2022 | Ball et al. |
| 11,359,146 B2 | 6/2022 | Quanci et al. |
| 11,365,355 B2 | 6/2022 | Quanci et al. |
| 11,395,989 B2 | 7/2022 | Quanci et al. |
| 11,441,077 B2 | 9/2022 | Quanci et al. |
| 11,441,078 B2 | 9/2022 | Quanci et al. |
| 11,486,572 B2 | 11/2022 | Quanci et al. |
| 11,505,747 B2 | 11/2022 | Quanci et al. |
| 11,508,230 B2 | 11/2022 | Quanci et al. |
| 11,597,881 B2 | 3/2023 | Quanci et al. |
| 11,643,602 B2 | 5/2023 | Quanci et al. |
| 11,680,208 B2 | 6/2023 | Quanci et al. |
| 11,692,138 B2 | 7/2023 | Quanci et al. |
| 11,746,296 B2 | 9/2023 | Choi et al. |
| 11,760,937 B2 | 9/2023 | Quanci et al. |
| 11,767,482 B2 | 9/2023 | Quanci et al. |
| 11,788,012 B2 | 10/2023 | Quanci et al. |
| 11,795,400 B2 | 10/2023 | West et al. |
| 11,807,812 B2 | 11/2023 | Quanci et al. |
| 11,819,802 B2 | 11/2023 | Quanci et al. |
| 11,845,037 B2 | 12/2023 | Quanci et al. |

(56) References Cited

U.S. PATENT DOCUMENTS

| | | |
|---|---|---|
| 11,851,724 B2 | 12/2023 | Quanci et al. |
| 11,939,526 B2 | 3/2024 | West et al. |
| 11,946,108 B2 | 4/2024 | Quanci et al. |
| 12,060,525 B2 | 8/2024 | Quanci et al. |
| 12,110,458 B2 | 10/2024 | Quanci et al. |
| 12,195,671 B2 | 1/2025 | Quanci et al. |
| 12,215,289 B2 | 2/2025 | Quanci et al. |
| 12,227,699 B2 | 2/2025 | Quanci et al. |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2004/0016377 A1 | 1/2004 | Johnson et al. |
| 2004/0220840 A1 | 11/2004 | Bonissone et al. |
| 2005/0087767 A1 | 4/2005 | Fitzgerald et al. |
| 2005/0096759 A1 | 5/2005 | Benjamin et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 | 5/2007 | Inamasu et al. |
| 2007/0116619 A1 | 5/2007 | Taylor et al. |
| 2007/0181717 A1 | 8/2007 | Fuller |
| 2007/0205091 A1* | 9/2007 | Barkdoll .............. C10B 33/10 104/295 |
| 2007/0251198 A1 | 11/2007 | Witter |
| 2008/0028935 A1 | 2/2008 | Andersson |
| 2008/0116052 A1 | 5/2008 | Eatough et al. |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0105852 A1 | 4/2009 | Wintrich et al. |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0015564 A1 | 1/2010 | Chun et al. |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0159247 A1 | 6/2010 | Kaya et al. |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0100273 A1 | 5/2011 | Ptacek |
| 2011/0120852 A1 | 5/2011 | Kim |
| 2011/0144406 A1 | 6/2011 | Masatsugu et al. |
| 2011/0156902 A1 | 6/2011 | Wang et al. |
| 2011/0162265 A1 | 7/2011 | Krumpp et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0272508 A1 | 11/2011 | Krebs et al. |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0179421 A1 | 7/2012 | Dasgupta |
| 2012/0180133 A1 | 7/2012 | Ai-Harbi et al. |
| 2012/0195815 A1 | 8/2012 | Moore et al. |
| 2012/0210635 A1 | 8/2012 | Edwards |
| 2012/0228115 A1 | 9/2012 | Westbrook |
| 2012/0247939 A1 | 10/2012 | Kim et al. |
| 2012/0285080 A1 | 11/2012 | Despen et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0213114 A1 | 8/2013 | Wetzig et al. |
| 2013/0216717 A1 | 8/2013 | Rago et al. |
| 2013/0220373 A1 | 8/2013 | Kim |
| 2013/0306462 A1* | 11/2013 | Kim .................... C10B 39/14 202/117 |
| 2014/0039833 A1 | 2/2014 | Sharpe, Jr. et al. |
| 2014/0156584 A1 | 6/2014 | Motukuri et al. |
| 2014/0183026 A1* | 7/2014 | Quanci ................ C10B 39/04 202/262 |
| 2014/0208997 A1 | 7/2014 | Alferyev et al. |
| 2014/0224123 A1 | 8/2014 | Walters |
| 2014/0245803 A1 | 9/2014 | Forsythe et al. |
| 2015/0041304 A1 | 2/2015 | Kiim et al. |
| 2015/0075962 A1 | 3/2015 | Shimoyama et al. |
| 2015/0122629 A1 | 5/2015 | Freimuth et al. |
| 2015/0143908 A1 | 5/2015 | Cetinkaya |
| 2015/0175433 A1 | 6/2015 | Micka et al. |
| 2015/0176095 A1 | 6/2015 | Connors et al. |
| 2015/0219530 A1 | 8/2015 | Li et al. |
| 2015/0226499 A1 | 8/2015 | Mikkelsen |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1 | 6/2016 | Kato et al. |
| 2016/0370082 A1 | 12/2016 | Olivo |
| 2016/0377430 A1 | 12/2016 | Kalagnanam et al. |
| 2017/0173519 A1 | 6/2017 | Naito |
| 2017/0182447 A1 | 6/2017 | Sappok et al. |
| 2017/0218274 A1 | 8/2017 | Yu et al. |
| 2017/0226425 A1 | 8/2017 | Kim et al. |
| 2017/0261417 A1 | 9/2017 | Zhang |
| 2017/0313943 A1 | 11/2017 | Valdevies |
| 2019/0317167 A1 | 10/2019 | LaBorde et al. |
| 2020/0071190 A1 | 3/2020 | Wiederin et al. |
| 2020/0139273 A1 | 5/2020 | Badiei |
| 2020/0173679 A1 | 6/2020 | O'Reilly et al. |
| 2020/0208063 A1 | 7/2020 | Quanci |
| 2021/0261877 A1 | 8/2021 | Despen et al. |
| 2021/0363427 A1 | 11/2021 | Quanci et al. |
| 2022/0056342 A1 | 2/2022 | Quanci et al. |
| 2022/0356410 A1 | 11/2022 | Quanci et al. |
| 2023/0258326 A1 | 8/2023 | Quanci et al. |
| 2023/0330596 A1 | 10/2023 | Bumb et al. |
| 2023/0360511 A1 | 11/2023 | Quanci et al. |
| 2023/0416629 A1 | 12/2023 | Quanci et al. |
| 2024/0059994 A1 | 2/2024 | Quanci et al. |
| 2024/0110103 A1 | 4/2024 | Quanci et al. |
| 2024/0150659 A1 | 5/2024 | Quanci et al. |
| 2024/0158709 A1 | 5/2024 | Quanci et al. |
| 2024/0158877 A1 | 5/2024 | Quanci et al. |
| 2024/0209265 A1 | 6/2024 | Quanci et al. |
| 2024/0229172 A1 | 7/2024 | Quanci et al. |
| 2024/0229173 A1 | 7/2024 | Quanci et al. |
| 2025/0027177 A1 | 1/2025 | Quanci et al. |

FOREIGN PATENT DOCUMENTS

| | | |
|---|---|---|
| CA | 2822841 | 7/2012 |
| CA | 2822857 | 7/2012 |
| CA | 2905110 A1 | 9/2014 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |

(56) References Cited

FOREIGN PATENT DOCUMENTS

| | | |
|---|---|---|
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 101211495 A | 7/2008 |
| CN | 201121178 Y | 9/2008 |
| CN | 101362971 A | 2/2009 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 101910530 A | 12/2010 |
| CN | 101921643 A | 12/2010 |
| CN | 102072829 A | 5/2011 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 202470353 U | 10/2012 |
| CN | 103399536 A | 11/2013 |
| CN | 103468289 A | 12/2013 |
| CN | 103468841 A | 12/2013 |
| CN | 103756699 A | 4/2014 |
| CN | 103913193 A | 7/2014 |
| CN | 203981700 U | 12/2014 |
| CN | 104498059 A | 4/2015 |
| CN | 105001914 A | 10/2015 |
| CN | 105137947 A | 12/2015 |
| CN | 105189704 A | 12/2015 |
| CN | 105264448 A | 1/2016 |
| CN | 105467949 A | 4/2016 |
| CN | 105842065 A | 8/2016 |
| CN | 106399607 A | 2/2017 |
| CN | 106661456 A | 5/2017 |
| CN | 106687564 A | 5/2017 |
| CN | 107022359 A | 8/2017 |
| CN | 107267183 A | 10/2017 |
| CN | 107445633 A | 12/2017 |
| CN | 108219807 A | 6/2018 |
| CN | 110141947 A | 8/2019 |
| CN | 100500619 C | 6/2020 |
| CN | 111778048 A | 10/2020 |
| CN | 113322085 A | 8/2021 |
| CN | 113462415 A | 10/2021 |
| CN | 114517099 A | 5/2022 |
| CN | 101921643 B | 12/2022 |
| CN | 116606664 A | 8/2023 |
| DE | 201729 C | 9/1908 |
| DE | 212176 | 7/1909 |
| DE | 1212037 B | 3/1966 |
| DE | 2212544 A | 1/1973 |
| DE | 2720688 A1 | 11/1978 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102004062936 A1 | 7/2006 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EA | 010510 B1 | 10/2008 |
| EP | 0126399 A1 | 11/1984 |
| EP | 0208490 A1 | 1/1987 |
| EP | 0418801 A1 | 3/1991 |
| EP | 0433498 A1 | 6/1991 |
| EP | 0903393 A2 | 3/1999 |
| EP | 1538503 A1 | 6/2005 |
| EP | 1860034 A1 | 11/2007 |
| EP | 2295129 A1 | 3/2011 |
| EP | 2468837 A1 | 6/2012 |
| FR | 2339664 | 8/1977 |
| FR | 2517802 | 6/1983 |
| FR | 2764978 | 12/1998 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 783720 A | 9/1957 |
| GB | 871094 | 6/1961 |
| GB | 923205 A | 5/1963 |
| GB | 2000193 A | 1/1979 |
| JP | S50148405 | 11/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | H0776713 A | 3/1995 |
| JP | 07188668 | 7/1995 |
| JP | 07216357 | 8/1995 |
| JP | H07204432 | 8/1995 |
| JP | H0843314 A | 2/1996 |
| JP | H08104875 A | 4/1996 |
| JP | 08127778 | 5/1996 |
| JP | H08218071 A | 8/1996 |
| JP | H09310074 A | 12/1997 |
| JP | H10273672 A | 10/1998 |
| JP | H11131074 | 5/1999 |
| JP | H11256166 A | 9/1999 |
| JP | 2000204373 A | 7/2000 |
| JP | 2000219883 A | 8/2000 |
| JP | 2001055576 A | 2/2001 |
| JP | 2001187887 A | 7/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003041618 A | 2/2003 |

(56) References Cited

FOREIGN PATENT DOCUMENTS

| | | |
|---|---|---|
| JP | 2003051082 A | 2/2003 |
| JP | 2003071313 A | 3/2003 |
| JP | 2003292968 A | 10/2003 |
| JP | 2003342581 A | 12/2003 |
| JP | 2004169016 A | 6/2004 |
| JP | 2005503448 A | 2/2005 |
| JP | 2005135422 A | 5/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2006257252 A | 9/2006 |
| JP | 2007063420 A | 3/2007 |
| JP | 3924064 B2 | 6/2007 |
| JP | 2007169484 A | 7/2007 |
| JP | 2007231326 A | 9/2007 |
| JP | 4101226 B2 | 6/2008 |
| JP | 2008231278 A | 10/2008 |
| JP | 2009001640 A | 1/2009 |
| JP | 2009019106 A | 1/2009 |
| JP | 2009073864 A | 4/2009 |
| JP | 2009073865 A | 4/2009 |
| JP | 2009135276 A | 6/2009 |
| JP | 2009144121 A | 7/2009 |
| JP | 2009209286 A | 9/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012072389 A | 4/2012 |
| JP | 2012102302 A | 5/2012 |
| JP | 2012102325 A | 5/2012 |
| JP | 2013006957 A | 1/2013 |
| JP | 2013510910 A | 3/2013 |
| JP | 2013189322 A | 9/2013 |
| JP | 2014009284 A | 1/2014 |
| JP | 2014040502 A | 3/2014 |
| JP | 2015094091 A | 5/2015 |
| JP | 2015199791 A | 11/2015 |
| JP | 2016169897 A | 9/2016 |
| JP | 2020007472 A | 1/2020 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030011016 A | 2/2003 |
| KR | 20030012458 A | 2/2003 |
| KR | 1020040020883 A | 3/2004 |
| KR | 20040107204 A | 12/2004 |
| KR | 20050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20140076155 A | 6/2014 |
| KR | 20150011084 A | 1/2015 |
| KR | 20150068557 A | 6/2015 |
| KR | 20170038102 A | 4/2017 |
| KR | 20170058808 A | 5/2017 |
| KR | 20170103857 A | 9/2017 |
| KR | 101862491 B1 | 5/2018 |
| KR | 20230118420 A | 8/2023 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2003025093 | 3/2003 |
| WO | WO2005023649 | 3/2005 |
| WO | WO2005031297 | 4/2005 |
| WO | WO2005115583 | 12/2005 |
| WO | WO2006010432 | 2/2006 |
| WO | WO2007103649 | 9/2007 |
| WO | WO2008034424 | 3/2008 |
| WO | WO2008105269 | 9/2008 |
| WO | WO2009147983 | 12/2009 |
| WO | WO2010032734 | 3/2010 |
| WO | WO2010103992 | 9/2010 |
| WO | WO2010107513 | 9/2010 |
| WO | WO2011000447 | 1/2011 |
| WO | WO2011126043 | 10/2011 |
| WO | 2012037454 A2 | 3/2012 |
| WO | WO2012029979 | 3/2012 |
| WO | WO2012031726 | 3/2012 |
| WO | WO2013023872 | 2/2013 |
| WO | WO2013145679 | 10/2013 |
| WO | WO2013153557 | 10/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |
| WO | WO2016033515 | 3/2016 |
| WO | WO2016086322 | 6/2016 |
| WO | WO2016109854 | 7/2016 |
| WO | WO2022159604 | 7/2022 |
| WO | WO2022235839 | 11/2022 |
| WO | 2023129090 A2 | 7/2023 |

OTHER PUBLICATIONS

U.S. Appl. No. 18/954,859, filed Nov. 21, 2024, Quanci.
U.S. Appl. No. 18/955,181, filed Nov. 21, 2024, Choi et al.
U.S. Appl. No. 18/958,671, filed Nov. 25, 2024, Quanci et al.
U.S. Appl. No. 18/972,005, filed Dec. 6, 2024, Quanci et al.
U.S. Appl. No. 18/971,912, filed Dec. 6, 2024, Quanci et al.
U.S. Appl. No. 18/977,609, filed Dec. 11, 2024, Quanci et al.
U.S. Appl. No. 19/054,358, filed Feb. 14, 2025, Quanci et al.
"Asbestos", Virginia Department of Health, https://www.vdh.virginia.gov/environmental-health/public-health-toxicology/asbestos/, updated 2023, 2 pages.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available online at http://people/duke.edu/-hpgavin/SystemID/References/Astrom-Feedback-2006.pdf ; 404 pages.
Basset et al., "Calculation of steady flow pressure loss coefficients for pipe junctions," Proc Instn Mech Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Item HT 56107 Briquette, 'H' Type Household or Domestic Use, SECV Brown Coal Mine, Yallourn, Victoria, circa 1925, Museums Victoria Collections, https://collections.museumsvictoria.com.au/items/2286568, published on Mar. 2, 2021; 3 pages.

(56) References Cited

OTHER PUBLICATIONS

"Ceramic fibers wool—to 1,300° C", gTeek, Dec. 29, 2017 (date obtained from google search tools), https://www.gteek.com/ceramic-fibers-woolp-to1-300-%C2%B0C, 15 pages.

Chaudhari, K., Cupola Furnace, engineersgalary.com Jan. 24, 2016; 4 pages.

Clean coke process: process development studies by USS Engineers and Consultants, Inc., Wisconsin Tech Search, request date Oct. 5, 2011, 17 pages.

"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.

Costa, et al., "Edge Effects on the Flow Characteristics in a 90 deg Tee Junction," Transactions of the ASME, Nov. 2006, vol. 128, pp. 1204-1217.

Crelling, et al., "Effects of Weathered Coal on Coking Properties and Coke Quality", Fuel, 1979, vol. 58, Issue 7, pp. 542-546.

Database WPI, Week 199115, Thomson Scientific, Lond, GB; AN 1991-107552.

De Cordova, et al. "Coke oven life prolongation—A multidisciplinary approach." 10.5151/2594-357X-2610 (2015) 12 pages.

Diez, et al., "Coal for Metallurgical Coke Production: Predictions of Coke Quality and Future Requirements for Cokemaking", International Journal of Coal Geology, 2002, vol. 50, Issue 1-4, pp. 389-412.

"High Alumina Cement-Manufacture, Characteristics and Uses," TheConstructor.org, https://theconstructor.org/concrete/high-alumina-cement/23686/; 12 pages.

"How Glass Is Made," Corning, https://www.corning.com/worldwide/en/innovation/materials-science/glass/how-glass-made.html, 2 pages.

Industrial Furnace Design Handbook, Editor-in-Chief: First Design Institute of First Ministry of Machinery Industry, Beijing: Mechanical Industry Press, pp. 180-183, Oct. 1981.

Ishiwata, et al. "Effect of coke diameter and oxygen concentration of blast on cupola operation." ISIJ International, 2011, vol. 51, pp. 1353-1359.

Ivanova, V. A. "Analysis of the requirements for foundry coke." IOP Conference Series: Materials Science and Engineering, 2020, vol. 986, pp. 1-6.

Joseph, B., "A tutorial on inferential control and its applications," Proceedings of the 1999 American Control Conference (Cat. No. 99CH36251), San Diego, CA, 1999, pp. 3106-3118 vol. 5.

Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.

Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.

Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173, 184.

Kusiorowski, et al., "Thermal decomposition of different types of abestos," Journal of Thermal Analysis and Calorimetry • Feb. 2012, 109, 693-704 (2012).

Lin, Rongying et al., "Study on the synergistic effect of calcium and aluminum on improving ash fusion temperature of semi-coke," International Journal of Coal Preparation and Utilization, May 31, 2019 (published online), vol. 42, No. 3, pp. 556-564.

Lipunov, et al. "Diagnostics of the Heating System and Lining of Coke Ovens," Coke and Chemistry, 2014, Vopl. 57, No. 12, pp. 489-492.

Madias, et al., "A review on stamped charging of coals" (2013). Available at https://www.researchgate.net/publication/263887759_A_review_on_stamped_charging_of_coals.

Metallurgical Coke MSDS, ArcelorMittal, May 30, 2011, available online at http://dofasco.arcelormittal.com/-/media/Files/A/Arcelormittal-Canada/material-safety/metallurgical-coke.pdf.

"Middletown Coke Company HRSG Maintenance BACT Analysis Option 1—Individual Spray Quenches Sun Heat Recovery Coke Facility Process Flow Diagram Middletown Coke Company 100 Oven Case #1-24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.

Office of the Federal Register, National Archives and Records Administration. (Apr. 14, 2005). 70 FR 19992—National Emission Standards for Coke Oven Batteries. [Government]. Office of the Federal Register, National Archives and Records Administration. https://www.govinfo.gov/app/details/FR-2005-04-15/05-6942.

Pearson, D.E., "Influence of Geology on CSR (Coke Strength After Reaction with C02)," 2009, 8 pages.

Practical Technical Manual of Refractories, Baoyu Hu, etc., Beijing: Metallurgical Industry Press, Chapter 6; 2004, 6-30.

Powell, et al. "Cupola Furnaces", ASM International, downloaded from http://dl.asminternational.org/handbooks/edited-volume/chapter-pdf/501030/a0005197.pdf; 9 pages.

Refractories for Ironmaking and Steelmaking: A History of Battles over High Temperatures; Kyoshi Sugita (Japan, Shaolin Zhang), 1995, p. 160, 2004, 2-29.

"Refractory Castables," Victas.com, Dec. 28, 2011 (date obtained from WayBack Machine), https://www/vitcas.com/refactory-castables; 5 pages.

Rose, Harold J., "The Selection of Coals for the Manufacture of Coke," American Institute of Mining and Metallurgical Engineers, Feb. 1926, 8 pages.

Schlueter, R. "What's so good about coke made from coal, Aug. 29, 2016," Belleview News-Democrat, Rschuleter@bnd.com; 4 pages.

Seal School, Coal v. Coke|Fast differences and Comparison. Viewable on YouTube (Year:2020).

Tiwari, et al., "A novel technique for assessing the coking potential of coals/cole blends for non-recovery coke making process," Fuel, vol. 107, May 2013, pp. 615-622.

Waddell, et al., "Heat-Recovery Cokemaking Presentation," Jan. 1999, pp. 1-25.

Walker D N et al, "Sun Coke Company's heat recovery cokemaking technology high coke quality and low environmental impact", Revue De Metallurgie—Cahiers D'informations Techniques, Revue De Metallurgie. Paris, Fr, (Mar. 1, 2003), vol. 100, No. 3, ISSN 0035-1563, p. 23.

Westbrook, "Heat-Recovery Cokemaking at Sun Coke," AISE Steel Technology, Pittsburg, PA, vol. 76, No. 1, Jan. 1999, pp. 25-28.

"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.

Yu et al., "Coke Oven Production Technology," Lianoning Science and Technology Press, first edition, Apr. 2014, pp. 356-358.

"Resources and Utilization of Coking Coal in China," Mingxin Shen ed., Chemical Industry Press, first edition, Jan. 2007, pp. 242-243, 247.

U.S. Appl. No. 07/587,742, filed Sep. 25, 1990, now U.S. Pat. No. 5,114,542, titled Nonrecovery Coke Oven Battery and Method of Operation.

U.S. Appl. No. 07/878,904, filed May 6, 1992, now U.S. Pat. No. 5,318,671, titled Method of Operation of Nonrecovery Coke Oven Battery.

U.S. Appl. No. 09/783,195, filed Feb. 14, 2001, now U.S. Pat. No. 6,596,128, titled Coke Oven Flue Gas Sharing.

U.S. Appl. No. 07/886,804, filed May 22, 1992, now U.S. Pat. No. 5,228,955, titled High Strength Coke Oven Wall Having Gas Flues Therein.

U.S. Appl. No. 08/059,673, filed May 12, 1993, now U.S. Pat. No. 5,447,606, titled Method of and Apparatus for Capturing Coke Oven Charging Emissions.

U.S. Appl. No. 08/914,140, filed Aug. 19, 1997, now U.S. Pat. No. 5,928,476, titled Nonrecovery Coke Oven Door.

U.S. Appl. No. 09/680,187, filed Oct. 5, 2000, now U.S. Pat. No. 6,290,494, titled Method and Apparatus for Coal Coking.

U.S. Appl. No. 10/933,866, filed Sep. 3, 2004, now U.S. Pat. No. 7,331,298, titled Coke Oven Rotary Wedge Door Latch.

(56) References Cited

OTHER PUBLICATIONS

U.S. Appl. No. 11/424,566, filed Jun. 16, 2006, now U.S. Pat. No. 7,497,930, titled Method and Apparatus for Compacting Coal for a Coal Coking Process.
U.S. Appl. No. 12/405,269, filed Mar. 17, 2009, now U.S. Pat. No. 7,998,316, titled Flat Push Coke Wet Quenching Apparatus and Process.
U.S. Appl. No. 13/205,960, filed Aug. 9, 2011, now U.S. Pat. No. 9,321,965, titled Flat Push Coke Wet Quenching Apparatus and Process.
U.S. Appl. No. 11/367,236, filed Mar. 3, 2006, now U.S. Pat. No. 8,152,970, titled Method and Apparatus for Producing Coke.
U.S. Appl. No. 12/403,391, filed Mar. 13, 2009, now U.S. Pat. No. 8,172,930, titled Cleanable in Situ Spark Arrestor.
U.S. Appl. No. 12/849,192, filed Aug. 3, 2010, now U.S. Pat. No. 9,200,225, titled Method and Apparatus for Compacting Coal for a Coal Coking Process.
U.S. Appl. No. 13/631,215, filed Sep. 28, 2012, now U.S. Pat. No. 9,683,740, titled Methods for Handling Coal Processing Emissions and Associated Systems and Devices.
U.S. Appl. No. 13/730,692, filed Dec. 28, 2012, now U.S. Pat. No. 9,193,913, titled Reduced Output Rate Coke Oven Operation With Gas Sharing Providing Extended Process Cycle.
U.S. Appl. No. 14/655,204, now U.S. Pat. No. 10,016,714, filed Jun. 24, 2015, titled Systems and Methods for Removing Mercury From Emissions.
U.S. Appl. No. 16/000,516, now U.S. Pat. No. 11,117,087, filed Jun. 5, 2018, titled Systems and Methods for Removing Mercury From Emissions.
U.S. Appl. No. 17/459,380, now, U.S. Pat. No. 11,845,037, filed Jun. 5, 2018, titled Systems and Methods for Removing Mercury From Emissions.
U.S. Appl. No. 13/830,971, filed Mar. 14, 2013, now U.S. Pat. No. 10,047,296, titled Non-Perpendicular Connections Between Coke Oven Uptakes and a Hot Common Tunnel, and Associated Systems and Methods, now U.S. Pat. No. 10,047,295.
U.S. Appl. No. 16/026,363, filed Jul. 3, 2018, now U.S. Pat. No. 11,008,517, titled Non-Perpendicular Connections Between Coke Oven Uptakes and a Hot Common Tunnel, and Associated Systems and Methods.
U.S. Appl. No. 13/730,796, filed Dec. 28, 2012, now U.S. Pat. No. 10,883,051, titled Methods and Systems for Improved Coke Quenching.
U.S. Appl. No. 17/140,564, filed Jan. 4, 2021, now U.S. Pat. No. 11,807,812, titled Methods and Systems for Improved Coke Quenching.
U.S. Appl. No. 13/730,598, filed Dec. 28, 2012, now U.S. Pat. No. 9,238,778, titled Systems and Methods for Improving Quenched Coke Recovery.
U.S. Appl. No. 14/952,267, filed Nov. 25, 2015, now U.S. Pat. No. 9,862,888, titled Systems and Methods for Improving Quenched Coke Recovery.
U.S. Appl. No. 15/830,320, filed Dec. 4, 2017, now U.S. Pat. No. 10,323,192, titled Systems and Methods for Improving Quenched Coke Recovery.
U.S. Appl. No. 13/730,735, filed Dec. 28, 2012, now U.S. Pat. No. 9,273,249, titled Systems and Methods for Controlling Air Distribution in a Coke Oven.
U.S. Appl. No. 14/655,013, filed Jun. 23, 2015, now U.S. Pat. No. 11,142,699, titled Vent Stack Lids and Associated Systems and Methods.
U.S. Appl. No. 17/471,491, filed Sep. 10, 2021, now U.S. Pat. No. 11,939,526, titled Vent Stack Lids and Associated Systems and Methods.
U.S. Appl. No. 13/843,166, filed Mar. 15, 2013, now U.S. Pat. No. 9,273,250, titled Methods and Systems for Improved Quench Tower Design.
U.S. Appl. No. 15/014,547, filed Feb. 3, 2016, now, U.S. Pat. No. 10,927,303, titled Methods for Improved Quench Tower Design.
U.S. Appl. No. 17/155,818, filed Jan. 22, 2021, now U.S. Pat. No. 11,746,296, titled Methods and Systems for Improved Quench Tower Design.
U.S. Appl. No. 14/655,003, filed Jun. 23, 2015, now U.S. Pat. No. 10,760,002, titled Systems and Methods for Maintaining a Hot Car in a Coke Plant.
U.S. Appl. No. 16/897,957, filed Jun. 10, 2020, now U.S. Pat. No. 11,359, 145, titled Systems and Methods for Maintaining a Hot Car in a Coke Plant.
U.S. Appl. No. 13/829,588, filed Mar. 14, 2013, now U.S. Pat. No. 9,193,915, titled Horizontal Heat Recovery Coke Ovens Having Monolith Crowns.
U.S. Appl. No. 15/322,176, filed Dec. 27, 2016, now U.S. Pat. No. 10,526,541, titled Horizontal Heat Recovery Coke Ovens Having Monolith Crowns.
U.S. Appl. No. 15/511,036, filed Mar. 14, 2017, now U.S. Pat. No. 10,968,383, titled Coke Ovens Having Monolith Component Construction.
U.S. Appl. No. 17/190,720, now U.S. Pat. No. 11,795,400, filed Mar. 3, 2021, titled Coke Ovens Having Monolith Component Construction.
U.S. Appl. No. 13/589,009, filed Aug. 17, 2012, now U.S. Pat. No. 9,359,554, titled Automatic Draft Control System for Coke Plants.
U.S. Appl. No. 15/139,568, filed Apr. 27, 2016, now U.S. Pat. No. 10,947,455, titled Automatic Draft Control System for Coke Plants.
U.S. Appl. No. 17/176,391, now U.S. Pat. No. 11,692,138, filed Feb. 16, 2021, titled Automatic Draft Control System for Coke Plants.
U.S. Appl. No. 18/321,530, filed May 22, 2023, now U.S. Pat. No. 12,195,671, titled Automatic Draft Control System for Coke Plants.
U.S. Appl. No. 18/977,609, filed Dec. 11, 2024, titled Automatic Draft Control System for Coke Plants.
U.S. Appl. No. 13/588,996, filed Aug. 17, 2012, now U.S. Pat. No. 9,243,186, titled Coke Plant Including Exhaust Gas Sharing.
U.S. Appl. No. 14/959,450, filed Dec. 4, 2015, now U.S. Pat. No. 10,041,002, titled Coke Plant Including Exhaust Gas Sharing.
U.S. Appl. No. 16/047,198, filed Jul. 27, 2018, now U.S. Pat. No. 10,611,965, titled Coke Plant Including Exhaust Gas Sharing.
U.S. Appl. No. 16/828,448, filed Mar. 24, 2020, now U.S. Pat. No. 11,441,077, titled Coke Plant Including Exhaust Gas Sharing.
U.S. Appl. No. 13/589,004, filed Aug. 17, 2012, now U.S. Pat. No. 9,249,357, titled Method and Apparatus for Volatile Matter Sharing in Stamp-Charged Coke Ovens.
U.S. Appl. No. 13/730,673, filed Dec. 28, 2012, now U.S. Pat. No. 9,476,547, titled Exhaust Flow Modifier, Duct Intersection Incorporating the Same, and Methods Therefor.
U.S. Appl. No. 15/281,891, filed Sep. 30, 2016, now U.S. Pat. No. 10,975,309, titled Exhaust Flow Modifier, Duck Intersection Incorporating the Same, and Methods Therefor.
U.S. Appl. No. 17/191,119, filed March 3, 3021, titled Exhaust Flow Modifier, Duck Intersection Incorporating the Same, and Methods Therefor.
U.S. Appl. No. 13/598,394, filed Aug. 29, 2012, now U.S. Pat. No. 9,169,439, titled Method and Apparatus for Testing Coal Coking Properties.
U.S. Appl. No. 14/865,581, filed Sep. 25, 2015, now U.S. Pat. No. 10,053,627, titled Method and Apparatus for Testing Coal Coking Properties, now U.S. Pat. No. 10,053,627.
U.S. Appl. No. 14/839,384, filed Aug. 28, 2015, now U.S. Pat. No. 9,580,656, titled Coke Oven Charging System.
U.S. Appl. No. 15/443,246, filed Feb. 27, 2017, now U.S. Pat. No. 9,976,089, titled Coke Oven Charging System.
U.S. Appl. No. 14/587,670, filed Dec. 31, 2014, now U.S. Pat. No. 10,619,101, titled Methods for Decarbonizing Coking Ovens, and Associated Systems and Devices.
U.S. Appl. No. 16/845,530, filed Apr. 10, 2020, now U.S. Pat. No. 11,359,146, titled Methods for Decarbonizing Coking Ovens, and Associated Systems and Devices.
U.S. Appl. No. 14/984,489, filed Dec. 30, 2015, now U.S. Pat. No. 10,975,310, titled Multi-Modal Beds of Coking Material.
U.S. Appl. No. 14/983,837, filed Dec. 30, 2015, now U.S. Pat. No. 10,968,395, titled Multi-Modal Beds of Coking Material.
U.S. Appl. No. 14/986,281, filed Dec. 31, 2015, now U.S. Pat. No. 10,975,311, titled Multi-Modal Beds of Coking Material.

(56) References Cited

OTHER PUBLICATIONS

U.S. Appl. No. 17/222,886, filed Apr. 12, 2021, titled Multi-Modal Beds of Coking Material.
U.S. Appl. No. 14/987,625, filed Jan. 4, 2016, now U.S. Pat. No. 11,060,032, titled Integrated Coke Plant Automation and Optimization Using Advanced Control and Optimization Techniques.
U.S. Appl. No. 17/172,476, filed Feb. 10, 2021, now U.S. Pat. No. 11,788,012, titled Integrated Coke Plant Automation and Optimization Using Advanced Control and Optimization Techniques.
U.S. Appl. No. 14/839,493, filed Aug. 28, 2015, now U.S. Pat. No. 10,233,392, titled Method and System for Optimizing Coke Plant Operation and Output.
U.S. Appl. No. 16/251,352, filed Jan. 18, 2019, now U.S. Pat. No. 11,053,444, titled Method and System for Optimizing Coke Plant Operation and Output.
U.S. Appl. No. 14/839,551, filed Aug. 28, 2015, now U.S. Pat. No. 10,308,876, titled Burn Profiles for Coke Operations.
U.S. Appl. No. 16/428,014, filed May 31, 2019, now U.S. Pat. No. 10,920,148, titled Improved Burn Profiles for Coke Operations.
U.S. Appl. No. 17/155,719, filed Jan. 22, 2021, now U.S. Pat. No. 11,441,078, titled Improved Burn Profiles for Coke Operations.
U.S. Appl. No. 14/839,588, filed Aug. 28, 2015, now U.S. Pat. No. 9,708,542, titled Method and System for Optimizing Coke Plant Operation and Output.
U.S. Appl. No. 15/392,942, filed Dec. 28, 2016, now U.S. Pat. No. 10,526,542, titled Method and System for Dynamically Charging a Coke Oven.
U.S. Appl. No. 16/735,103, filed Jan. 6, 2020, now U.S. Pat. No. 11,214,739, titled Method and System for Dynamically Charging a Coke Oven.
U.S. Appl. No. 15/614,525, filed Jun. 5, 2017, now U.S. Pat. No. 11,508,230, titled Methods and Systems for Automatically Generating a Remedial Action in an Industrial Facility.
U.S. Appl. No. 18/047,916, filed Oct. 19, 2022, now U.S. Pat. No. 12,190,701, titled Methods and Systems For Automatically Generating a Remedial Action in an Industrial Facility.
U.S. Appl. No. 18/958,671, filed Nov. 25, 2024, titled Methods and Systems for Automatically Generating a Remedial Action in an Industrial Facility.
U.S. Appl. No. 15/987,860, filed May 23, 2018, now U.S. Pat. No. 10,851,306, titled System and Method for Repairing a Coke Oven.
U.S. Appl. No. 17/076,563, filed Oct. 21, 2020, now U.S. Pat. No. 11,186,778, titled System and Method for Repairing a Coke Oven.
U.S. Appl. No. 17/521,061, now U.S. Pat. No. 11,845,898, filed Nov. 8, 2021, titled System and Method for Repairing a Coke Oven.
U.S. Appl. No. 17/135,483, filed Dec. 28, 2020, now U.S. Pat. No. 12,227,699, titled Oven Health Optimization Systems and Methods.
U.S. Appl. No. 19/054,358, filed Feb. 14, 2025, titled Oven Health Optimization Systems and Methods.
U.S. Appl. No. 16/729,053, filed Dec. 27, 2019, now U.S. Pat. No. 11,760,937, titled Oven Uptakes.
U.S. Appl. No. 16/729,036, filed Dec. 27, 2019, now U.S. Pat. No. 11,365,355, titled Systems and Methods for Treating a Surface of a Coke Plant.
U.S. Appl. No. 17/747,708, filed May 18, 2022, now U.S. Pat. No. 12,060,525, titled Systems and Methods for Treating a Surface of a Coke Plant.
U.S. Appl. No. 18/770,264, filed Jul. 11, 2024, titled Systems and Methods for Treating a Surface of a Coke Plant.
U.S. Appl. No. 16/729,201, filed Dec. 27, 2019, titled Gaseous Tracer Leak Detection.
U.S. Appl. No. 16/729,122, filed Dec. 27, 2019, now U.S. Pat. No. 11,395,989, titled Methods and Systems for Providing Corrosion Resistant Surfaces in Contaminant Treatment Systems.
U.S. Appl. No. 17/843,164, filed Jun. 17, 2022, now U.S. Pat. No. 11,819,802, titled Methods and Systems for Providing Corrosion Resistant Surfaces in Contaminant Treatment Systems.
U.S. Appl. No. 16/729,068, filed Dec. 27, 2019, now U.S. Pat. No. 11,486,572, titled Systems and Methods for Utilizing Flue Gas.
U.S. Appl. No. 17/947,520, filed Sep. 19, 2022, titled Systems and Methods for Utilizing Flue Gas.
U.S. Appl. No. 16/729,129, filed Dec. 27, 2019, now U.S. Pat. No. 11,008,518, titled Coke Plant Tunnel Repair and Flexible Joints.
U.S. Appl. No. 17/320,343, filed May 14, 2021, now U.S. Pat. No. 11,597,881, titled Coke Plant Tunnel Repair and Flexible Joints.
U.S. Appl. No. 18/168,142, filed Feb. 13, 2023, titled Coke Plant Tunnel Repair and Flexible Joints.
U.S. Appl. No. 16/729,170, now U.S. Pat. No. 11,193,069, filed Dec. 27, 2019, titled Coke Plant Tunnel Repair and Anchor Distribution.
U.S. Appl. No. 17/532,058, now U.S. Pat. No. 11,505,747, filed Nov. 22, 2021, titled Coke Plant Tunnel Repair and Anchor Distribution.
U.S. Appl. No. 17/967,615, filed Oct. 17, 2022, titled Coke Plant Tunnel Repair and Anchor Distribution.
U.S. Appl. No. 16/729,157, filed Dec. 27, 2019, now U.S. Pat. No. 11,071,935, titled Particulate Detection for Industrial Facilities, and Associated Systems and Methods.
U.S. Appl. No. 16/729,057, filed Dec. 27, 2019, now U.S. Pat. No. 11,021,655, titled Decarbonization of Coke Ovens and Associated Systems and Methods.
U.S. Appl. No. 17/321,857, filed May 17, 2021, now U.S. Pat. No. 11,643,602, titled Decarbonization of Coke Ovens and Associated Systems and Methods.
U.S. Appl. No. 18/313,622, filed May 8, 2023, titled Decarbonization of Coke Ovens and Associated Systems and Methods.
U.S. Appl. No. 16/729,212, filed Dec. 27, 2019, now U.S. Pat. No. 11,261,381, titled Heat Recovery Oven Foundation.
U.S. Appl. No. 17/584,672, now U.S. Pat. No. 11,845,897, filed Jan. 26, 2022, titled Heat Recovery Oven Foundation.
U.S. Appl. No. 18/492,913, filed Oct. 24, 2023, titled Heat Recovery Oven Foundation.
U.S. Appl. No. 16/729,219, now U.S. Pat. No. 11,098,252, filed Dec. 27, 2019, titled Spring-Loaded Heat Recovery Oven System and Method.
U.S. Appl. No. 17/388,874, filed Jul. 29, 2021, now, U.S. Pat. No. 11,680,208, titled Spring-Loaded Heat Recovery Oven System and Method.
U.S. Appl. No. 17/736,960, filed May 20, 2022, titled Foundry Coke Products, and Associated Systems and Methods.
U.S. Appl. No. 17/306,895, now U.S. Appl. No. 11/767,482, filed May 3, 2021, now U.S. Pat. No. 11,767,482, titled High-Quality Coke Products.
U.S. Appl. No. 18/363,465, filed Aug. 1, 2023, titled High-Quality Coke Products.
U.S. Appl. No. 18/466,549, filed Sep. 13, 2023, titled High-Quality Coke Products.
U.S. Appl. No. 18/793,631, filed Aug. 2, 2024, now U.S. Pat. No. 12,215,289, titled High-Quality Coke Products.
U.S. Appl. No. 18/971,912, filed Dec. 6, 2024, titled Systems for Filtering Fines From Coke Products and Associated Devices and Methods.
U.S. Appl. No. 18/501,488, filed Nov. 3, 2023, now U.S. Pat. No. 12,110,458, titled Coal Blends, Foundry Coke Products, and Associated Systems, Devices, and Methods.
U.S. Appl. No. 18/501,795, filed Nov. 3, 2023, titled Coal Blends, Foundry Coke Products, and Associated Systems, Devices, and Methods.
U.S. Appl. No. 18/052,739, filed Nov. 4, 2022, now U.S. Pat. No. 11,946,108, titled Foundry Coke Products and Associated Processing Methods Via Cupolas.
U.S. Appl. No. 18/586,236, filed Feb. 23, 2024, titled Foundry Coke Products and Associated Processing Methods Via Cupolas.
U.S. Appl. No. 18/954,859, filed Nov. 21, 2024, titled Systems, Devices and Methods for Screening Industrial Products.
U.S. Appl. No. 18/052,760, filed Nov. 2, 2022, now U.S. Pat. No. 11,851,724, titled Foundry Coke Products, and Associated Systems, Devices, and Methods.
U.S. Appl. No. 18/506,746, filed Nov. 10, 2023, titled Foundry Coke Products, and Associated Systems, Devices, and Methods.
U.S. Appl. No. 18/892,228, filed Sep. 20, 2024, titled Foundry Coke Products, and Associated Systems, Devices, and Methods.

(56) References Cited

OTHER PUBLICATIONS

U.S. Appl. No. 18/955,181, filed Nov. 21, 2024, titled Emissions Recovery Systems for Industrial Facilities, and Associated Assemblies and Methods.
U.S. Appl. No. 18/972,005, filed Dec. 6, 2024, titled Milling Systems and Methods for Producing Materials With a Particular Particle Size Distribution.
U.S. Appl. No. 18/971,647, filed Dec. 6, 2024, titled Systems and Methods for Capturing Greenhouse Gases From Coke Production Facilities.
U.S. Appl. No. 18/511,148, filed Nov. 16, 2023, titled Products Comprising Char and Carbon, and Associated Systems, Devices, and Methods.
U.S. Appl. No. 18/511,621, filed Nov. 16, 2023, titled Pelletized Products and Associated Systems, Devices, and Methods.
U.S. Appl. No. 18/949,426, filed Nov. 15, 2024, titled Pelletized Products and Associated Systems, Devices and Methods.
Gkotsis, et al., "Membrane-Based Technologies for Post-Combustion CO2 Capture from Flue Gases: Recent Progress in Commonly Employed Membrane Materials," Membranes 2023, 13, 898; 27 pages.
Mitsubishi Heavy Industries America, Inc., 'Development and demonstration of wasteheat integration with solvent process for more efficient CO2 removal from coal fired flue gas', 2017NETL CO2 Capture Technology Project Review Meeting, Aug. 22, 2017, pp. 1-43.
International Search Report and Written Opinion issued Mar. 10, 2025 for PCT/US2024/056843; 11 pages.

\* cited by examiner

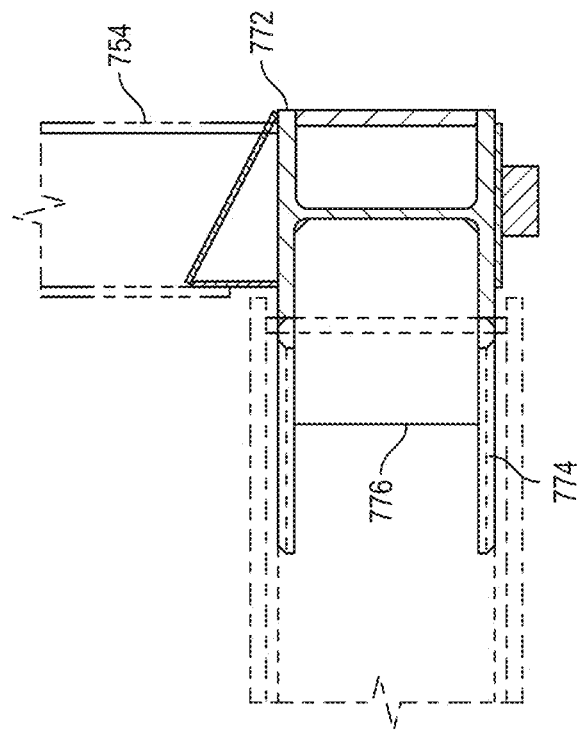
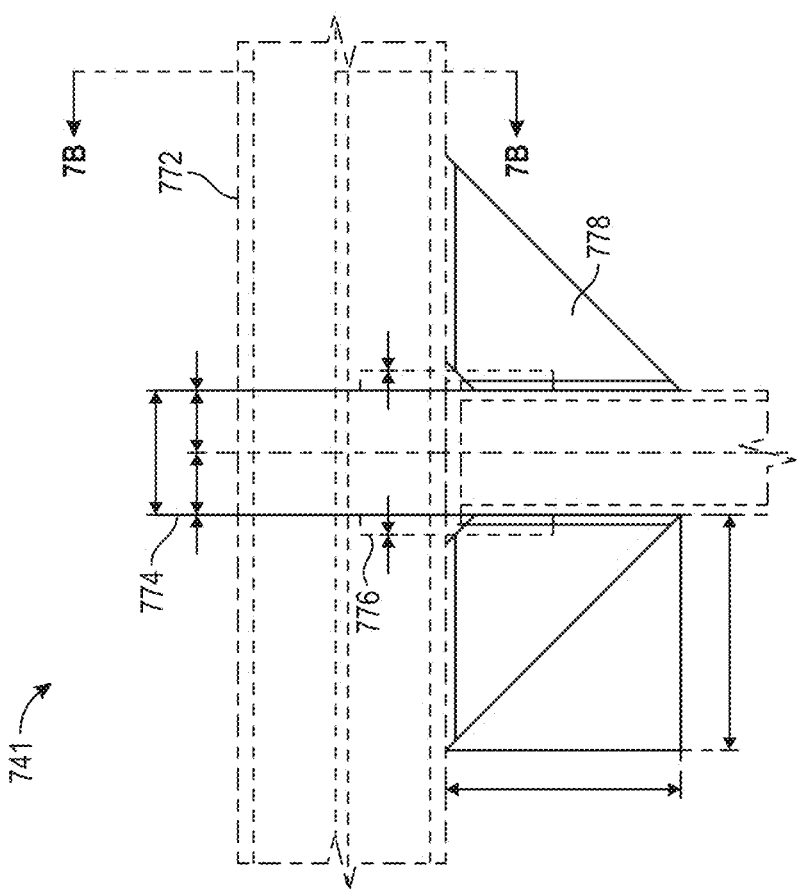
FIG. 7A
FIG. 7B

FLAT PUSH HOT CAR FOR FOUNDRY COKE AND ASSOCIATED SYSTEMS AND METHODS

CROSS-REFERENCE TO RELATED APPLICATION(S)

The present application claims the benefit of U.S. Provisional Patent Application No. 63/601,490, filed Nov. 21, 2023, the disclosure of which is incorporated herein by reference in its entirety.

TECHNICAL FIELD

The present disclosure relates to industrial hot cars for transporting industrial material, and associated systems and methods. Some embodiments relate to systems, devices, and methods for transporting foundry coke using a flat push hot car.

BACKGROUND

Coke is a solid carbon fuel and carbon source used to melt and reduce iron ore in the production of steel. To make coke, finely crushed coal is fed into a coke oven and heated in an oxygen depleted environment under closely controlled atmospheric conditions. Such an environment drives off volatile compounds in the coal, leaving behind coke. In some coking plants, once the coal is "coked out" or fully coked, an oven door is opened and the hot coke is pushed from the oven into a hot box of a flat push hot car ("hot car"). The hot car then transports the hot coke from the coke oven to a quenching area (e.g., wet or dry quenching) to cool the coke below its ignition temperature. After being quenched, the coke is screened and loaded into rail cars or trucks for shipment or later use.

Over time, the volatile coal constituents (i.e., water, coal-gas, coal-tar, etc.) released during the coking process can accumulate on the interior surfaces of the coke oven, forming gummy, solidified by-product deposits. As used herein, "deposit(s)" refers to one or more coking by-products that can accumulate within the coke oven, such as, for example, clinkers, ash, and others. Such deposits can have a variety of adverse effects on coke production, including slowing and/or complicating the hot coke pushing operation, decreasing the effective dimensions of the oven, and lowering the thermal conductivity of the oven walls and/or floor. Because of such adverse effects, deposit removal ("decarbonization") is a mandatory aspect of routine coke oven maintenance in order to maintain coke plant efficiency and yield.

To remove deposits from the coke ovens, oven operation (and thus coke production) must be interrupted so that the deposits can be targeted and pushed out of the ovens and into the hot car hot box for disposal. Much like the hot coke, deposits are extremely hot and exert a large amount of thermal and mechanical stress on the hot box in addition to the wear and tear of routine hot coke transportation. For these reasons, the hot box and/or the hot box's individual components can have a relatively short life. Many conventional coke plants attempt to mitigate damage to the hot box by breaking up large deposits and transporting them to a quench tower for cooling in manageable, smaller portions. However, such an iterative approach takes a long time to remove the waste, thus keeping the ovens/quench tower out of operation and coke production at a halt. In addition, removing the waste in pieces increases the number of transports required of the hot cars, exposing hot cars and/or its individual components to increased amount of thermal and mechanical stress.

BRIEF DESCRIPTION OF THE DRAWINGS

Features, aspects, and advantages of the presently disclosed technology may be better understood with regard to the following drawings.

FIG. 7A is a top view of a base of an industrial car with supporting gusset plates in accordance with embodiments of the present technology.

FIG. 7B is an enlarged cross-sectional view of the base of FIG. 7A along section 7B-7B.

Figure 1:
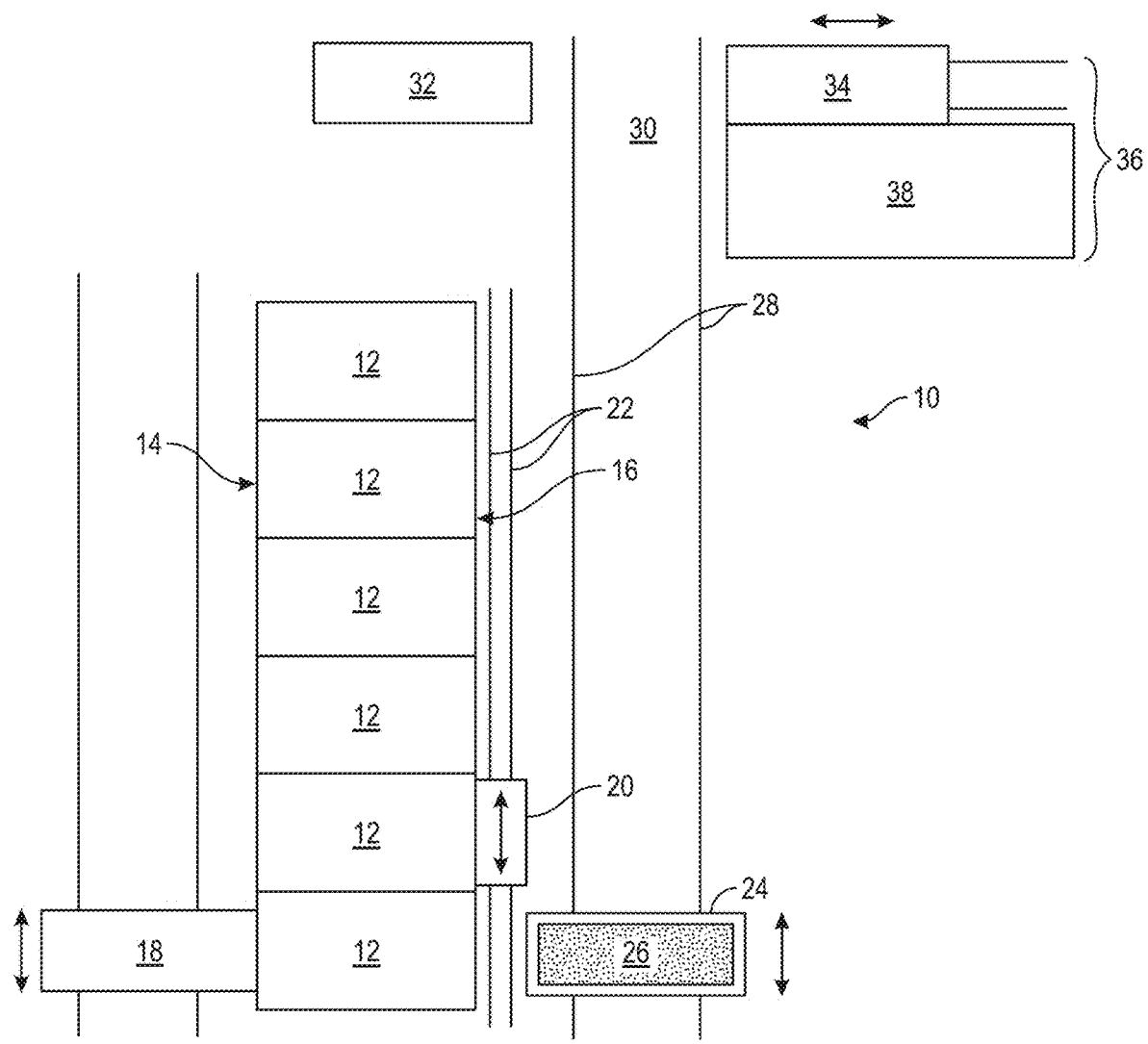
FIG. 1 is a plan schematic view of a portion of a coke plant in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

Embodiments of the present technology relate to industrial cars for holding high-temperature materials, and associated systems and methods. Some examples relate to flat push hot cars ("hot cars") for transporting coke (e.g., foundry coke) and deposits (e.g., coking by-products). To make coke, finely crushed coal is fed into a coke oven and heated in an oxygen depleted environment under closely controlled atmospheric conditions. The heating process drives off volatile compounds in the coal, leaving behind hot coke. The hot coke can then be pushed into a hot car for transportation to a quenching area. Over time, the volatile coal constituents (i.e., water, coal-gas, coal-tar, etc.) released during the coking process can accumulate on the interior surfaces of the coke oven, forming gummy, solidified by-product deposits. Such deposits can have a variety of adverse effects on coke production, including slowing and/or complicating the hot coke pushing operation, decreasing the effective dimensions of the oven, and lowering the thermal conductivity of the oven walls and/or floor. Because of such adverse effects, deposit removal ("decarbonization") is a mandatory aspect of routine coke oven maintenance in order to maintain coke plant efficiency and yield.

In some coke plants, oven operation (and thus coke production) is interrupted so that the deposits can be targeted and pushed out of the ovens and into the hot car hot box for disposal. Much like the hot coke, deposits are extremely hot and exert a large amount of thermal and mechanical stress on the hot car in addition to the wear and tear of routine hot coke transportation. In conventional hot cars, plates or other protective structures can be bolted onto the base (e.g., the floor) and/or sidewalls of the hot box. However, because the plates are fixedly coupled to the base and sidewalls (e.g., at the locations of the bolts), the plates are unable to freely expand upon thermal expansion (due to exposure to hot industrial materials), leading to high mechanical stress levels and warping. For these reasons, the hot car and/or the hot car's individual components can have a relatively short life and/or require frequent maintenance.

Many conventional coke plants attempt to mitigate damage to the hot box by breaking up large deposits and transporting them to a quench tower for cooling in manageable, smaller portions. However, such an iterative approach takes a long time to remove the waste, thus keeping the ovens/quench tower out of operation and coke production at a halt. In addition, removing the waste in pieces increases the number of transports required of the hot cars, exposing hot cars and/or its individual components to increased amount of thermal and mechanical stress. It can also be important to properly remove any dust or emissions, which can be environmental hazards, from within the hot cars.

Embodiments of the present technology address at least some of the above described issues. For example, embodiments of the present technology include an industrial car configured to hold materials at high temperatures, such as temperatures in excess of 2000° F. The industrial car can include an at least partially enclosed hot box having a base and a pair of opposing sidewalls extending upward from the base. Cross members and coupling members can be fixedly coupled to at least one of the base or the sidewalls, while surface plates are disposed adjacent to the coupling members. Because the surface plates are not directly coupled to the coupling members, but rather "float" thereon, the surface plates can move or expand in response to exposure to hot industrial materials. Clips coupled to the surface plates can keep the surface plates adjacent the corresponding coupling members while still maintaining clearance between adjacent surface plates.

In some embodiments, an industrial car includes an at least partially enclosed hot box having a base and a pair of opposing sidewalls extending upward from the base. Each sidewall can comprise vertical beams extending upward from the base, side plates coupled between successive ones of the vertical beams, and stiffeners coupled to exterior surfaces of the side plates. The stiffeners can comprise sloped cover plates configured to reduce material build-up on the sidewall.

Some conventional industrial cars include curved roofs that can be costly or difficult to manufacture or replace, and can reach high levels of mechanical stress in operation. In some embodiments, an industrial car includes an at least partially enclosed hot box having a base, a pair of opposing sidewalls extending upward from the base, and a roof. The roof can comprise a first non-curved member and a second non-curved member abutting the first non-curved member.

Industrial materials such as hot coke or deposits, when carried into, out of, and/or by industrial cars, can create dust, exhaust gas, and other emissions that can deteriorate the quality of the industrial materials and be hazardous to the environment when released from the industrial car. In some embodiments, a method of directing emission from an industrial car includes removing, via first, second, and third emission ducts, dust and exhaust flow from an at least partially enclosed hot box of the industrial car having a roof, and directing, via the first, second, and third emission ducts, the dust and exhaust flow to a dust collector system. The first emission duct can extend from a central portion of the roof, the second emission duct can extend from a first side portion of the roof, and the third emission duct can extend from a second side portion of the roof. The roof can comprise a first non-curved member and a second non-curved member abutting the first non-curved member.

In the Figures, identical or similar reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Industrial Facility Utilizing a Hot Car

FIG. 1 is a plan view of a coke oven battery 10 and associated equipment, including an industrial car 24 (also referred to as "hot car 24"), according to embodiments of the technology. As used herein, "hot car" may comprise a flat push hot car, train, and/or a combined flat push hot car/quench car. The typical coke oven battery 10 contains a plurality of side-by-side coke ovens 12. Each of the coke ovens 12 has a coal inlet end 14 and a coke outlet end 16 opposite the inlet end 14. Once the coal is fully coked (typically 24-120 hours), an exit door removing device 20 is positioned adjacent the outlet end 16 of the oven 12 and removes an exit door of the oven 12. After removing the exit door, the door removing device 20 is moved away from the outlet end 16 of the oven 12 along door removal rails 22. A discharge ram 18 positioned adjacent to the inlet end 14 of the oven 12 pushes the hot coke and/or deposits out of the oven 12. The discharge ram 18 may include a device for removing an inlet end 14 oven door prior to pushing the coke out of the oven 12.

A hot car 24 (described in greater detail below) is positioned adjacent to the outlet end 16 of the oven 12 for collection of hot coke and/or deposits 26 pushed from the oven by the discharge ram 18. In some embodiments, the hot coke and/or deposits 26 pushed into the hot car 24 form a relatively intact cake of coke having negligible breakage. The term "cake," as used herein, can refer to a solid, cohesive mass that remains largely whole and does not easily disintegrate into smaller pieces or fines during handling and transportation. Once the hot coke or deposits 26 is loaded onto the hot car 24, the car 24 is transported on rails 28 to a quench car area 30. In the quench car area 30, the hot coke slab or deposits 26 on the hot car 24 is pushed by a stationary pusher 32 onto a quench car 34. Once the quench car 34 receives the hot coke or deposits 26, the quench car 34 is positioned in a quench station 36 wherein the hot coke or deposits 26 is quenched with sufficient water to cool the coke or deposits 26 to below a coking temperature. The quenched coke is then dumped onto a receiving dock 38 for further cooling and transport to a coke storage area.

In some embodiments described herein, a single hot car 24 may be used for multiple coke batteries 10 since the coke is quenched in a separate quench car 34. As soon as the hot coke or deposits 26 is pushed from the hot car 24 onto the quench car 34, the hot car 24 may be repositioned adjacent to the outlet end 16 of another oven 12 for collection of coke or deposits 26 from that oven 12. In further embodiments, the hot car 24 can be a combined hot car/quench car.

III. Industrial Cars for Transporting Hot Industrial Material

Figure 2:
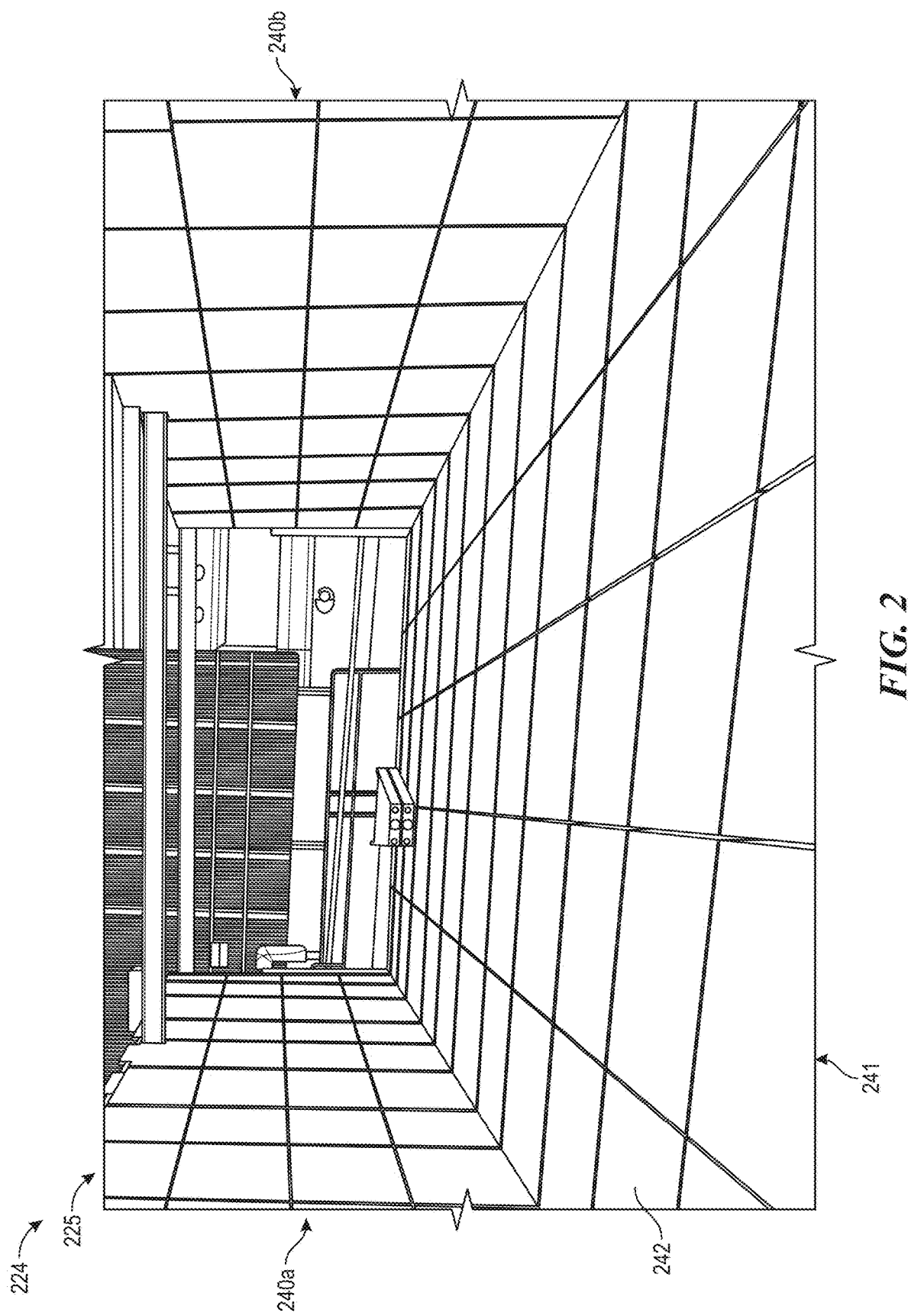
FIG. 2 is an elevational end view of an industrial car in accordance with embodiments of the present technology.

FIG. 2 is an elevational end view of an industrial car 224 in accordance with embodiments of the present technology. The industrial car 224 can be a flat push hot car (e.g., the hot car 24) to be used in a coke plant. The industrial car 224 can include an at least partially enclosed hot box 225 having a base 241, a first sidewall 240a extending upward from the base 241, and a second sidewall 240b also extending upward from the base 241 (collectively referred to as "sidewalls 240"). The industrial car 224 can also include wear plates or surface plates 242 coupled to and covering the base 241 and/or the sidewalls 240 (obscuring the base 241 and the sidewalls 240 from view). In some embodiments, the industrial car 224 includes the surface plates 242 coupled to and covering the ceiling of the industrial car 224 (not shown). In the illustrated embodiment, the surface plates 242 each have a rectangular shape and are arranged in a grid-like pattern with gaps therebetween.

During operation of the industrial car 224, materials at high temperatures (e.g., in excess of 2000° F.) can be put into the hot box 225. The materials can include hot coke, broken clinkers, bio-char coke, petcoke, coal, anthracite, breeze, biochar, biomaterials, lignite, met coals, thermal coal, coke, pad coal, pad coke, other high thermally treated coal and/or coke products, other carbon-containing products, and/or other industrial products. The gaps between the surface plates 242 can be sized to prevent materials with a dimension above a threshold from passing through. As described in further detail herein, the surface plates 242 are able to shift or vibrate relative to one another (e.g., move into and out of the gaps) such that the surface plates 242 appear to "float" on the base 241 or the sidewalls 240. As the hot box 225 receives and holds the high-temperature materials, the surface plates 242, which contact the materials, can freely move and distribute any force (e.g., upon impact between the materials and the surface plates), reducing overall wear of the industrial car 224. In addition, as heat is transferred from the high-temperature materials to the surface plates 242, the surface places 242 can thermally expand into the gaps without excessively abutting against or overlapping with adjacent surface plates 242, reducing overall wear of the industrial car 224.

The surface plates 242 can be made of metal (e.g., steel, wear metals), ceramic, refractory, and/or other suitable material. In some embodiments, the surface plates 242 can have different shapes or be arranged differently. For example, the surface plates 242 can each have a triangular, pentagonal, hexagonal, or other shape. The surface plates 242 can also be coupled to only one or two of the base 241, the first sidewall 240a, and the second sidewall 240b.

Figure 3:
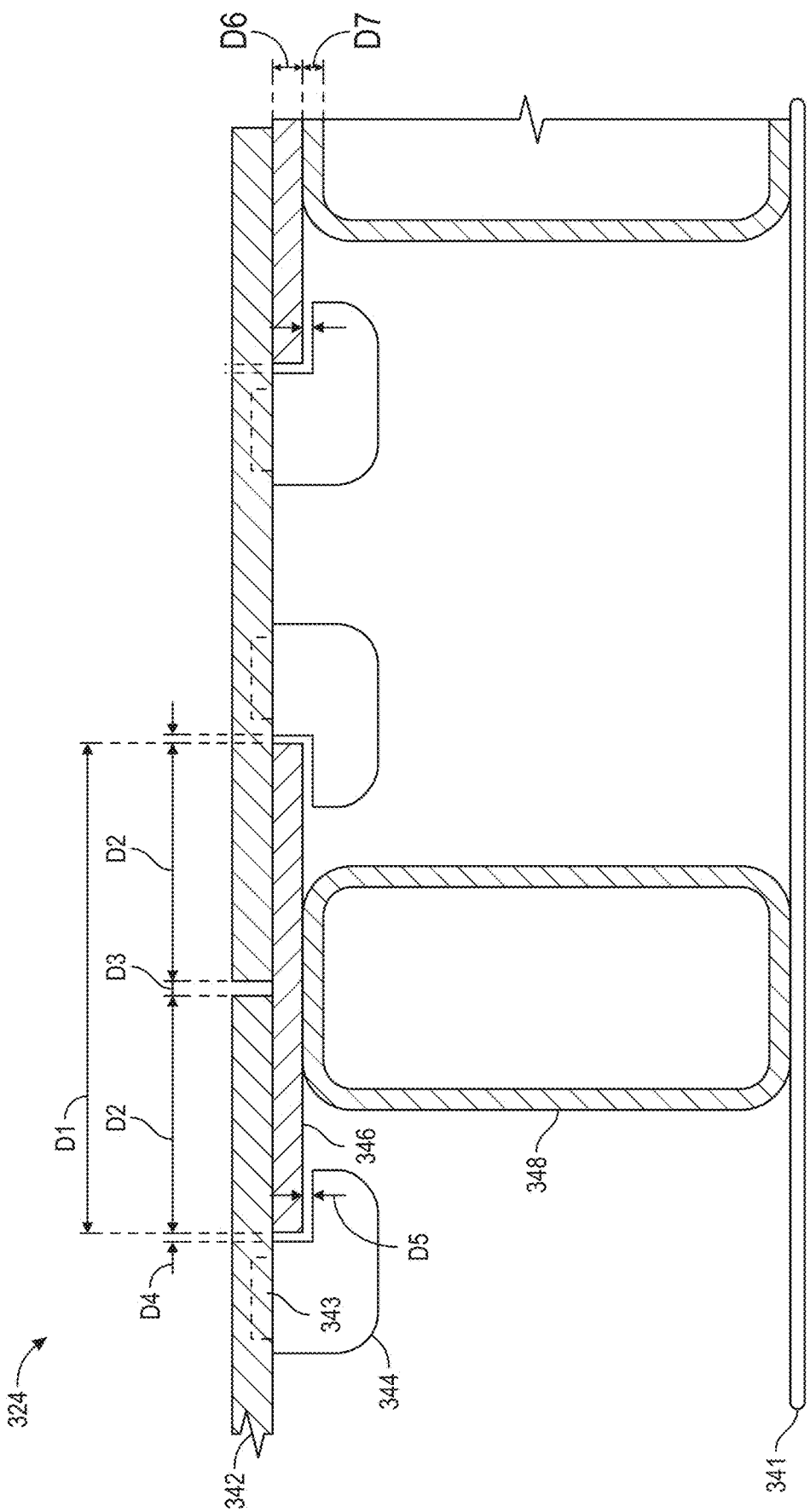
FIG. 3 is an enlarged, schematic cross-sectional view of a base of an industrial car in accordance with embodiments of the present technology.

FIG. 3 is an enlarged, schematic cross-sectional view of a base 341 (e.g., the base 241) of an industrial car 324 (e.g., the industrial car 224) in accordance with embodiments of the present technology. In the illustrated embodiment, cross members 348 are coupled to the base 341, and coupling members 346 are each coupled to at least one of the cross members 348. Individual ones of wear plates or surface plates 342 (e.g., the surface plates 242) are adjacent at least two of the coupling members 346, but are not directly coupled to the coupling members 346. Clips 344 are coupled to the surface plates 342. In the illustrated embodiment, each clip 344 has an L-shape and curves around and/or complements one or more sides of the coupling members 346.

In some embodiments, the coupling members 346 are welded to corresponding ones of the cross members 348. Additionally or alternatively, the surface plates 342 can be oriented substantially parallel to the coupling members 346. In some embodiments, the clips 344 are coupled to the surface plates 342 via fasteners and/or protrusions 343 that fit into recesses of the surface plates 342, or via welding. In some embodiments, individual ones of the surface plates 342 are coupled to at least one, two, three, four, five, six, seven, eight, nine, ten, or more clips 344.

Each coupling member 346 can have dimension D1 (e.g., length or width), which can be at least 10 inches, 12 inches, 14 inches, or 10-14 inches. Each surface plate 342 can interface one of the coupling members 346 across dimension D2, which can be at least 4 inches, 6 inches, 8 inches, or 4-8 inches. Adjacent surface plates 342 can be spaced apart from another by dimension D3 (e.g., gap) that is equal to or greater than a predetermined threshold distance, which can be at least 0.1 inch, 0.3 inch, 0.5 inch, or 0.1-0.5 inch. Each clip 344 can be spaced apart from one of the coupling members 346 by horizontal dimension D4 and vertical dimension D5, each of which can be at least 0.1 inch, 0.2 inch, 0.3 inch, or 0.1-0.3 inch. Each surface place 342 can have thickness D6, which can be at least 0.8 inch, 1 inch, 1.2 inch, or 0.8-1.2 inch. Each coupling member 346 can have thickness D7, which can be at least 0.5 inch, 0.8 inch, 1 inch, or 0.5-1 inch. As described further herein, because the surface plates 342 are not directly coupled to the coupling members 346 and are free to shift or thermally expand, the dimensions D1-D7 represent average dimensions when the components of the industrial car 324 are at room temperature.

During operation of the industrial car 324, high-temperature materials that are loaded therein can move around and exert force on the surface places 342. The coupling members 346 remain fixed to the corresponding cross members 348, and the clips 344 remain fixed to the corresponding surface plates 342. The surface plates 342 are not directly coupled to, but instead "float" on, the coupling members 346 such that the surface plates 342 are movable independent from the coupling members 346. Therefore, the surfaces plates 342 are free to move in any direction, as the gaps or clearance (e.g., defined by dimensions D3, D4, and D5) allow for such movement. The clips 344 can be configured to keep the surface plates 342 adjacent the corresponding two successive ones of the coupling members 346. Moreover, as the surface plates 342 thermally expand due to the heat from the high-temperature materials, the surface plates 342 can thermally expand independently of the coupling members 346, and can expand into the gap defined by dimension D3, avoiding excessive compressive force between adjacent surface plates 342. For example, as the temperatures of the surface plates 342 rise during operation, one or more dimensions of the surface plates 342 can increase by between 0.5-5%, 1-2%, or other percentage range. The coupling members 346 can remain fixed relative to the cross members 348, and the clips 344 can remain fixed relative to the surface plates 342. Furthermore, in some embodiments, the surface plates 342 are removable from the industrial car 324. For example, individual ones of the surface plates 342 can be separated from the clips 344 by, e.g., disengaging the fasteners and/or protrusions 343. Thus, the surface plates 342 can be easily removed for maintenance and/or replacement without the need to remove other components such as the coupling members 346, which are expected to have longer lifespans.

Figure 4A:
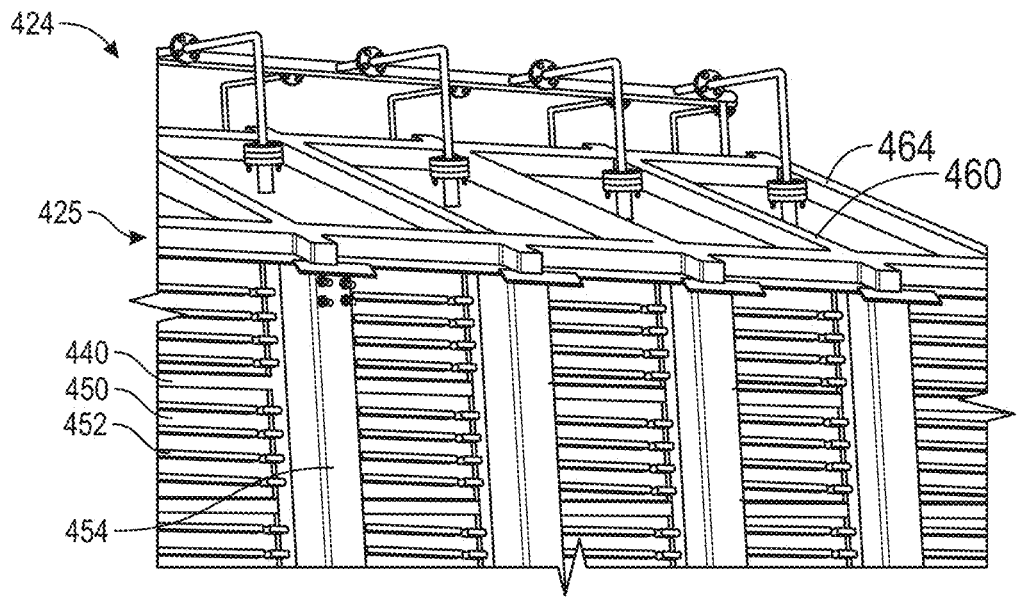
FIGS. 4A and 4B are side views of an industrial car in accordance with embodiments of the present technology.
Figure 4B:
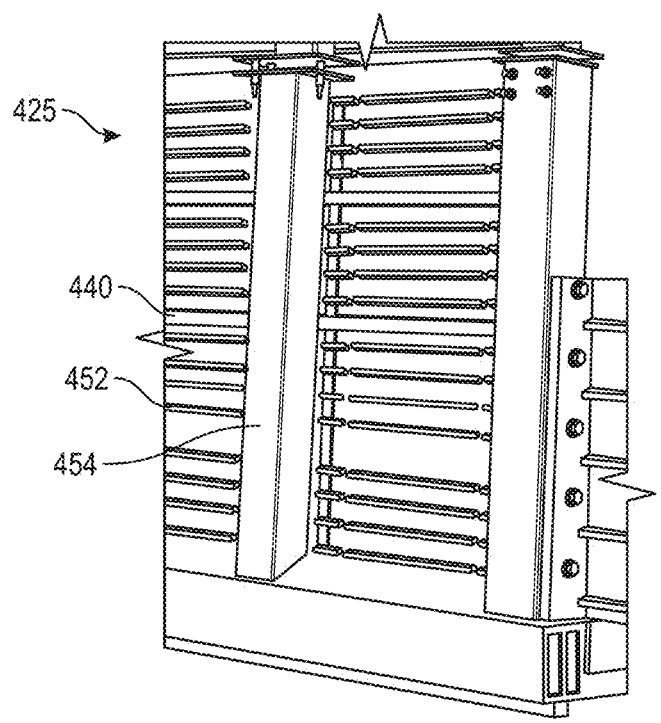

FIGS. 4A and 4B are side views of an industrial car 424 (e.g., the industrial car 224) in accordance with embodiments of the present technology. The industrial car 424 can include an at least partially enclosed hot box 425 (e.g., the hot box 225) having a base (not shown), sidewalls 440, and a roof 460. The sidewalls 440 can include vertical beams 454 extending upward from the base, side plates 450 coupled between individual ones of the vertical beams 454, and stiffeners 452 coupled to exterior surfaces of the side plates 450. Adjacent stiffeners 452 can be spaced apart from one another by no more than 1 inch, 2 inches, 3 inches, 6 inches, 9, inches, 12 inches, 24 inches, 36 inches, etc. In some embodiments, the stiffeners 452 comprise sloped or angled cover plates. The sloped cover plates can extend or be sloped horizontally or in a downward direction (e.g., at an acute angle relative to the direction of gravity). The roof 460 can include angled beams 464 extending from each sidewall 440. In some embodiments, the angled beams 464 are oriented at an acute angle relative to the vertical beams 454. In some embodiments, individual ones of the vertical beams 454 and/or the angled beams 464 comprise hollow structural section (HSS) beams. In some embodiments, individual ones of the HSS beams include at least one open end.

During operation of the industrial car 424, the stiffeners 452 can reduce warping of the side plates 450, which can result from mechanical loads, fatigue, thermal expansion and contraction, etc. The stiffeners 452 can also be configured to reduce material build-up (e.g., rust, dust, the high-temperature materials, corrosive substances from the operating environment) on the side plates 450. The use of HSS beams (e.g., as opposed to I-beams) can similarly provide increased structural strength to the sidewalls 440 and the roof 460, and reduce material build-up and corrosion. In some embodiments, individual ones of the HSS beams include at least one vent hole such that any hot air, pressurized air, moisture, etc. built up within the HSS beams can be released therethrough.

Figure 5:
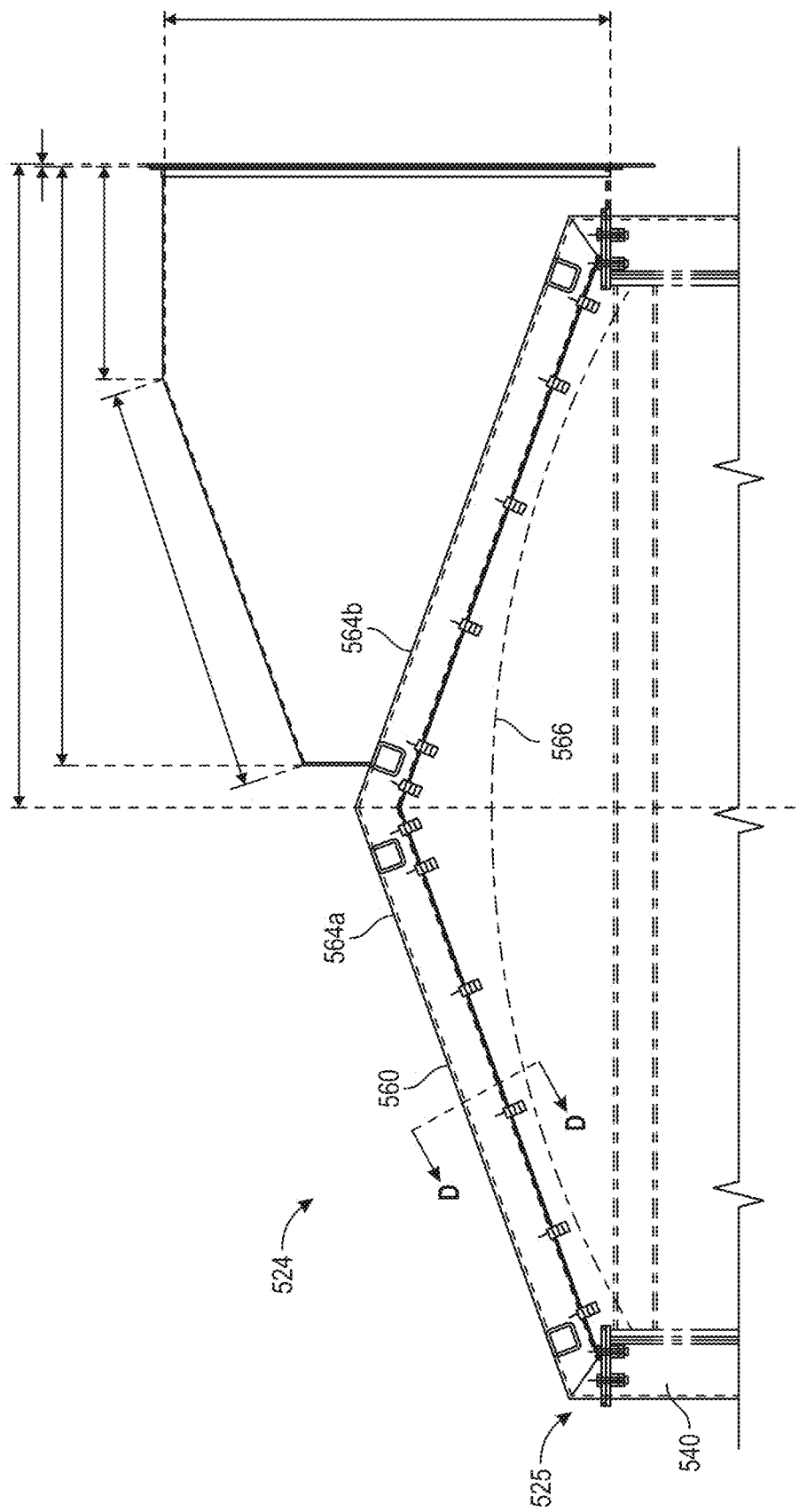
FIG. 5 is an enlarged, schematic cross-sectional view of a roof of an industrial car in accordance with embodiments of the present technology.

FIG. 5 is an enlarged, schematic cross-sectional view of a roof 560 (e.g., the roof 460) of an industrial car 524 (e.g., the industrial car 224) in accordance with embodiments of the present technology. The industrial car 524 can include an at least partially enclosed hot box 525 (e.g., the hot box 225) having sidewalls 540 (e.g., the sidewalls 440) and the roof 560, and a furnace door opening 566. The roof 560 can include one or more first non-curved members 564a (e.g., the angled beams 464) extending from one of the sidewalls 540, and one or more second non-curved members 564b (e.g., the angled beams 464) extending from the other one of the sidewalls 540 and abutting the one or more first non-curved members 564a. In some embodiments, the first and second non-curved members 564a, 564b join at an obtuse angle to define the peaked shape of the roof 560.

The peaked shape of the roof 560 can have several advantages over other roof designs (e.g., curved, rolled roof designs). For example, the roof 560 can have lower manufacturing costs and can be easier to replace parts for maintenance purposes. The roof 560 is also expected to have decreased stress at connection points and thermally expand in one direction, providing increased predictability of the stress points throughout the life of the industrial car 524. Furthermore, as described further herein, the peaked shape of the roof 560 facilitates dust and emissions removal.

Figure 6:
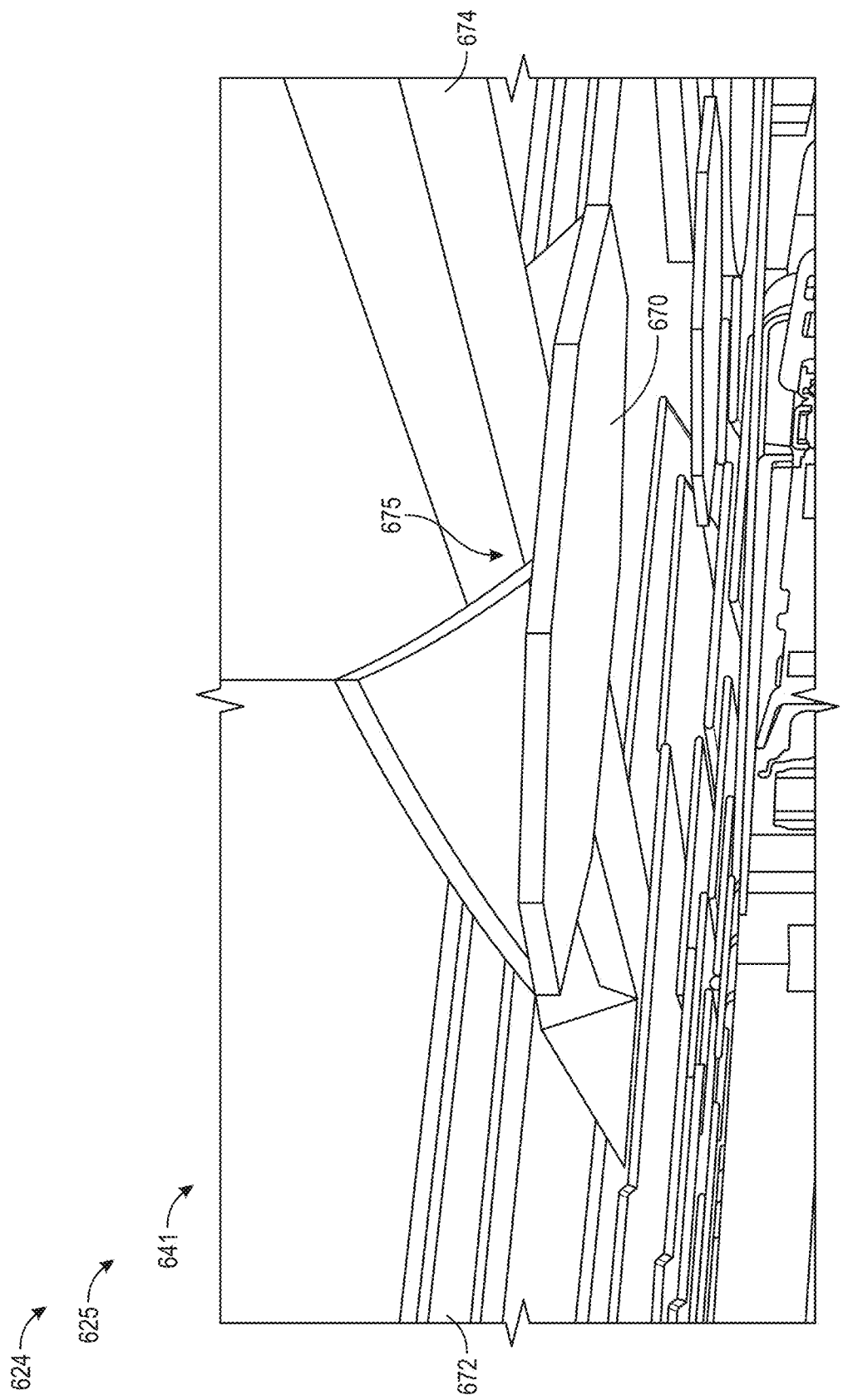
FIG. 6 is a bottom perspective view of an industrial car in accordance with embodiments of the present technology.

FIG. 6 is a bottom perspective view of an industrial car 624 (e.g., the industrial car 224) in accordance with embodiments of the present technology. The industrial car 624 can include an at least partially enclosed hot box 625 (e.g., the hot box 225) having a base 641 (e.g., the base 241). The base 641 can include main floor beams 672 extending in a first direction and cross floor beams 674 extending in a second direction. The main floor beams 672 and the cross floor beams 674 can be arranged in a grid-like pattern and intersect at joints 675. In some embodiments, the joints 675 are welded joints. The industrial car 624 can also include load plates 670 coupled to individual ones of the joints 675. In the illustrated embodiment, the load plate 670 has an octagonal shape. In other embodiments, the load plate 670 can have other suitable shapes to cover the joints 675. In some embodiments, sloped plates are added to the load plates 670.

During operation of the industrial car 624, the load plates 670 can distribute mechanical load and stress points at the joints 675 to the main floor beams 672 and the cross floor beams 674. If the joints 675 are welded, for example, the weld can be a primary source of mechanical failure, so distributing the load from the welded joints 675 to the main floor beams 672 and the cross floor beams 674 can help prevent weld cracks or other failures. The sloped plates can help prevent material build-up and corrosion on the load plates 670.

FIG. 7A is a top view of a base 741 (e.g., the base 241) of an industrial car in accordance with embodiments of the present technology. FIG. 7B is an enlarged cross-sectional view along section 7B-7B in FIG. 7A, or an enlarged cross-sectional side view of the base 741. The industrial car can include an at least partially enclosed hot box 625 (e.g., the hot box 225) having the base 741 and sidewalls. The base 741 includes main floor beams 772 (e.g., the main floor beams 672), cross floor beams 774 (e.g., the cross floor beams 674), and gussets 778. The industrial car can also include vertical beams 754 (FIG. 7B) (e.g., the vertical beams 454) that form the sidewalls.

The cross floor beams 774 can include tabs or protrusions 776 that extend at least partially into the main floor beams 772 and/or the vertical beams 754. In some embodiments, the main floor beams 772 and/or the vertical beams 754 comprise I-beams and the protrusions 776 can fit into the recess of the I-beam shape. In some embodiments, the main floor beams 772 and/or the vertical beams 754 comprise HSS beams with apertures configured to receive and hold the protrusion 776.

During operation of the industrial car, the weight of the materials loaded thereon can cause separation of the cross floor beams 774 from the main floor beams 772 and/or the vertical beams 754. The protrusions 776 can provide structural support to the industrial car by forming a stronger connection between the cross floor beams 774, the main floor beams 772, and the vertical beams 754. Furthermore, the protrusions 776 can distribute the load on the cross floor beams 774 to the sides of the industrial car, which can be supported by rollers.

Figure 7C:
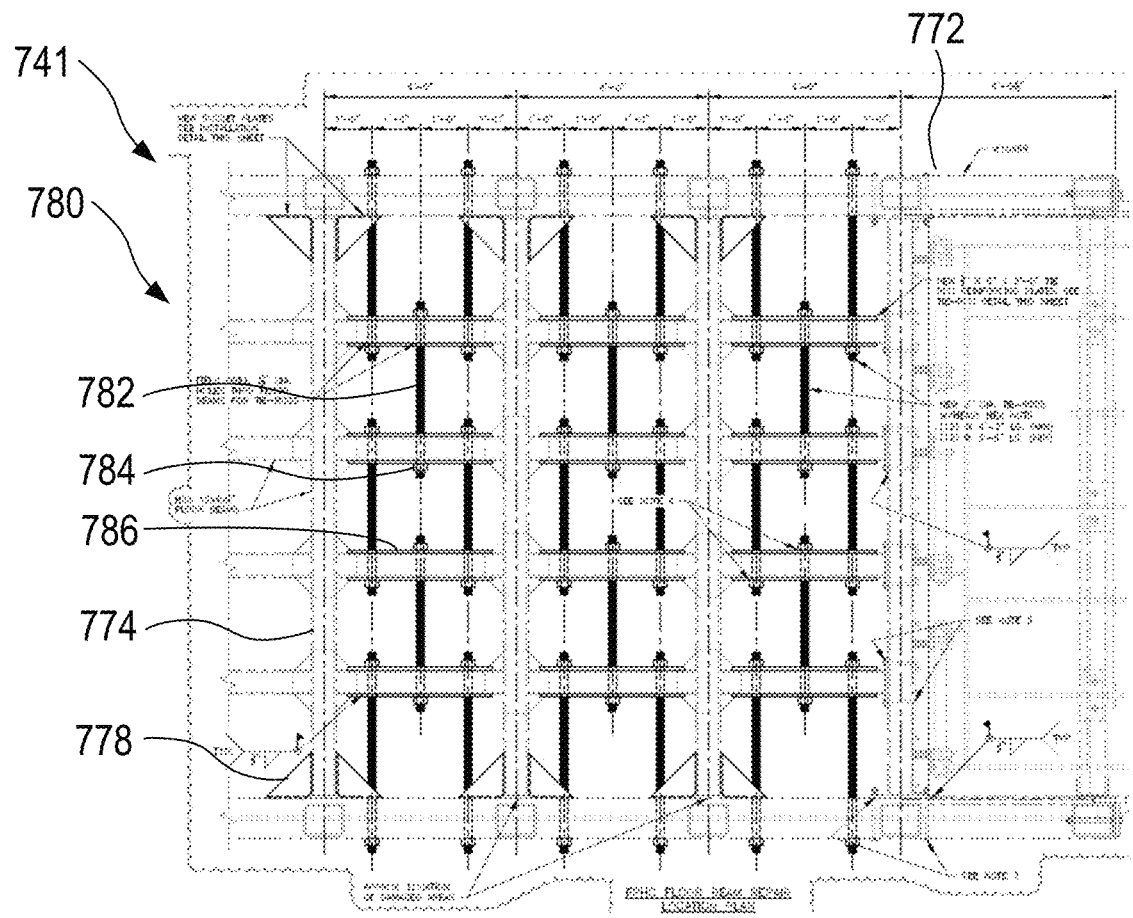
FIG. 7C is a top view of a base of an industrial car with a tie rod system in accordance with embodiments of the present technology.

FIG. 7C is a top view of the base 741 of an industrial car with a tie rod system 780 in accordance with embodiments of the present technology. In the illustrated embodiment, the tie rod system 780 includes tie rods 782 coupled between adjacent main floor beams 772. More specifically, one or two tie rods 782 are coupled between adjacent main floor beams 772 and positioned between adjacent cross floor beams 774. The tie rods 782 can comprise metal rods extending through apertures in the main floor beams 772 and secured by fasteners 784 (e.g., the tie rods 782 can be threaded and the fasteners 784 can comprise nuts). During operation of the industrial car, the tie rod system 780 can provide mechanical support by keeping the components of the base 741 together. For example, the tie rods 782 can be configured to be under tension and hold the main floor beams 772 together, reducing risk of industrial car separation.

In some embodiments, the main floor beams 772 are laminated with reinforcement pad plates 786 (e.g., metal plates) such that the force exerted by the fasteners 784 is distributed across the plates 786, and such that damage to the main floor beams 772 is avoided or at least reduced. The thickness of each plate 786 can be at least ½ inch, ¾ inch, 1 inch, 1¼ inch, 1½ inch, or more. Additionally or alternatively, the tie rod system 780 can include tie rods 782 coupled between adjacent cross floor beams 774.

Figure 7D:
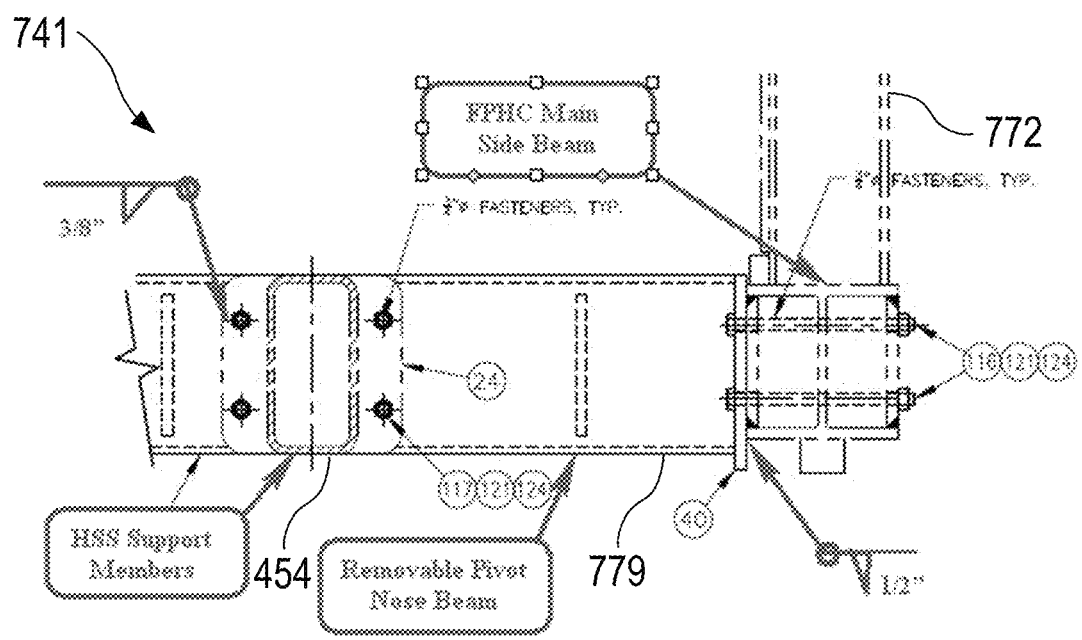
FIG. 7D is a top view of a base of an industrial car with a welded pivot nose beam in accordance with embodiments of the present technology.

FIG. 7D is a top view of the base 741 of an industrial car with a welded pivot nose beam 779 in accordance with embodiments of the present technology. In conventional industrial cars, the pivot nose beam may be removably coupled to other components of the industrial car, such as the main floor beams 772 (e.g., via bolts or other fasteners). The coupling can become loose, resulting in the pivot nose beam 779, which supports the pivot nose and thus often forming the location of highest mechanical stress, becoming unsupported. Therefore, it can be advantageous to weld in place or otherwise fixedly secure the pivot nose beam 779 to other components of the base 741, such as the main floor beams 772, the vertical support beams 454 (e.g., HSS beams), etc.

Figure 8A:
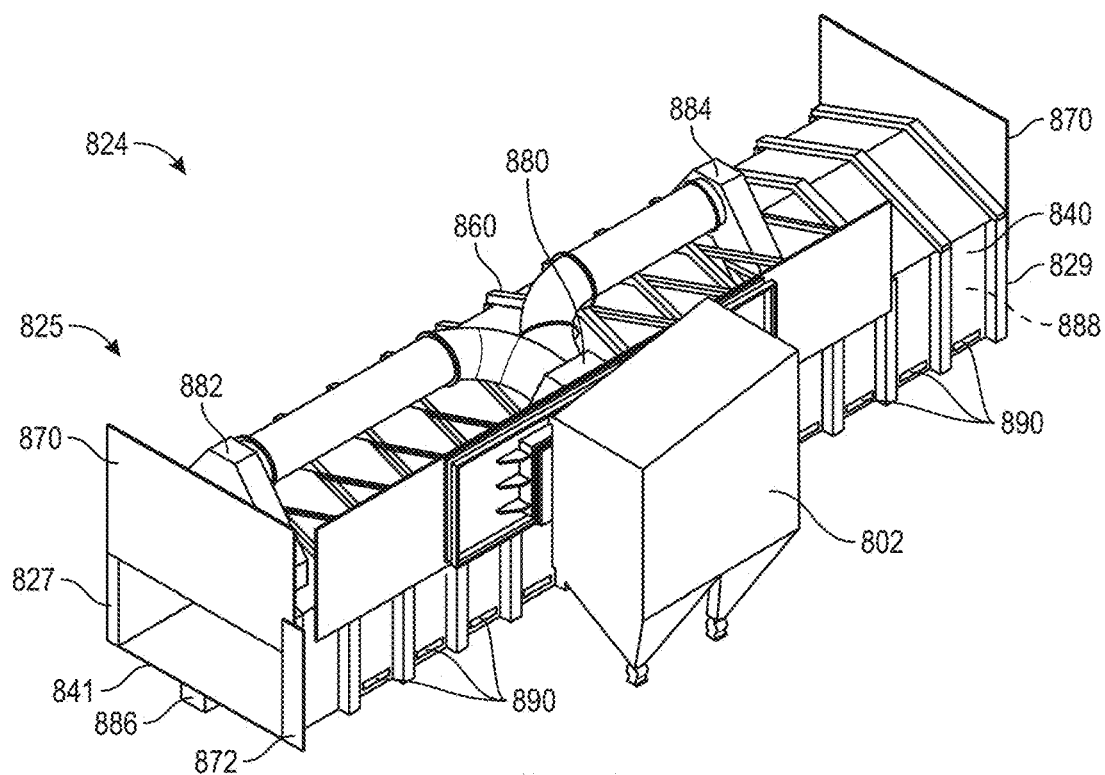
FIGS. 8A and 8B are right and left perspective views, respectively, of an industrial car in accordance with embodiments of the present technology.
Figure 8B:
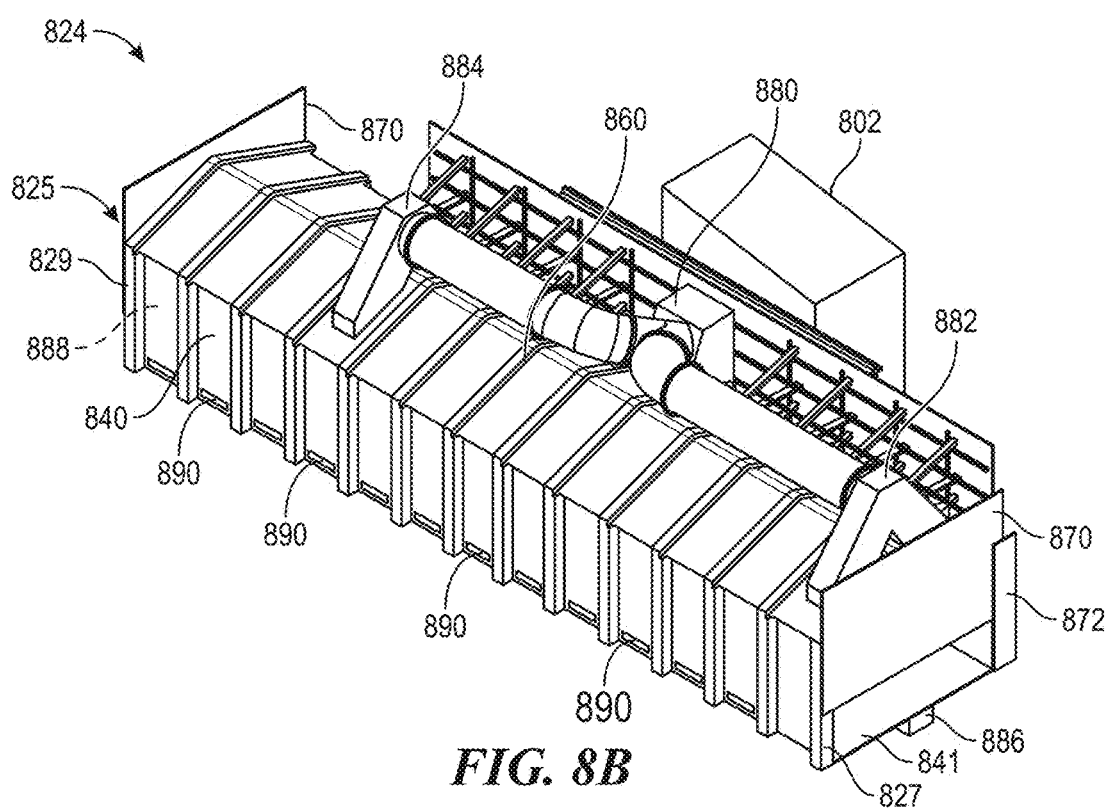

IV. Systems and Methods for Removing or Directing Emissions from Industrial Operations FIGS. 8A and 8B are right and left perspective views, respectively, of an industrial car 824 (e.g., the industrial car 224) and a dust collector system 802 in accordance with embodiments of the present technology. The industrial car 824 can include an at least partially enclosed hot box 825 (e.g., the hot box 225) having a base 841, sidewalls 840 extending upward from the base 841, and a roof 860. In some embodiments, the roof 860 comprises a first non-curved member and a second non-curved member abutting the first non-curved member. The hot box 825 can include an entry 827 for receiving high-temperature materials (e.g., receiving hot coke from a coke oven) and an exit 829 for releasing the materials (e.g., transferring hot coke to a quench car).

The industrial car 824 can also include one or more emission ducts fluidly coupled to the interior of the hot box 825. For example, the industrial car 824 can include a first emission duct 880 extending from an intermediate portion of the roof 860, a second emission duct 882 extending from a first side portion of the roof 860 peripheral to the intermediate portion (e.g., towards the entry 827), and a third emission duct 884 extending from a second side portion of the roof 860 peripheral to the intermediate portion (e.g., towards the exit 829). The first, second, and third emission ducts 880, 882, 884 can be fluidly coupled to the dust collector system 802 positioned adjacent the sidewall 840. In some embodiments, the industrial car 824 can also include a fourth emission duct 886 coupled to an underside of the base 841 adjacent the entry 827 and a fifth emission duct 888 coupled to the underside of the base 841 adjacent the exit 829. In some embodiments, the industrial car 824 includes a first slide door 870a coupled to the entry 827 and/or a second slide door 870b coupled to the exit 829 (collectively referred to as "slide doors 870"), or other suitable sealing mechanisms. In some embodiments, the industrial car 824 omits one or both of the slide doors 870, and the corresponding sides of the industrial car 824 can remain open or sealed instead. In some embodiments, the industrial car 824 includes one or more air knives 872 positioned adjacent the entry 827 and/or the exit 829. In some embodiments, one or more of the sidewalls 840 includes one or more slot openings 890 (e.g., at a lower portion of the sidewalls 840) allowing fluid connection between the interior of the hot box 825 and the environment.

Figure 8C:
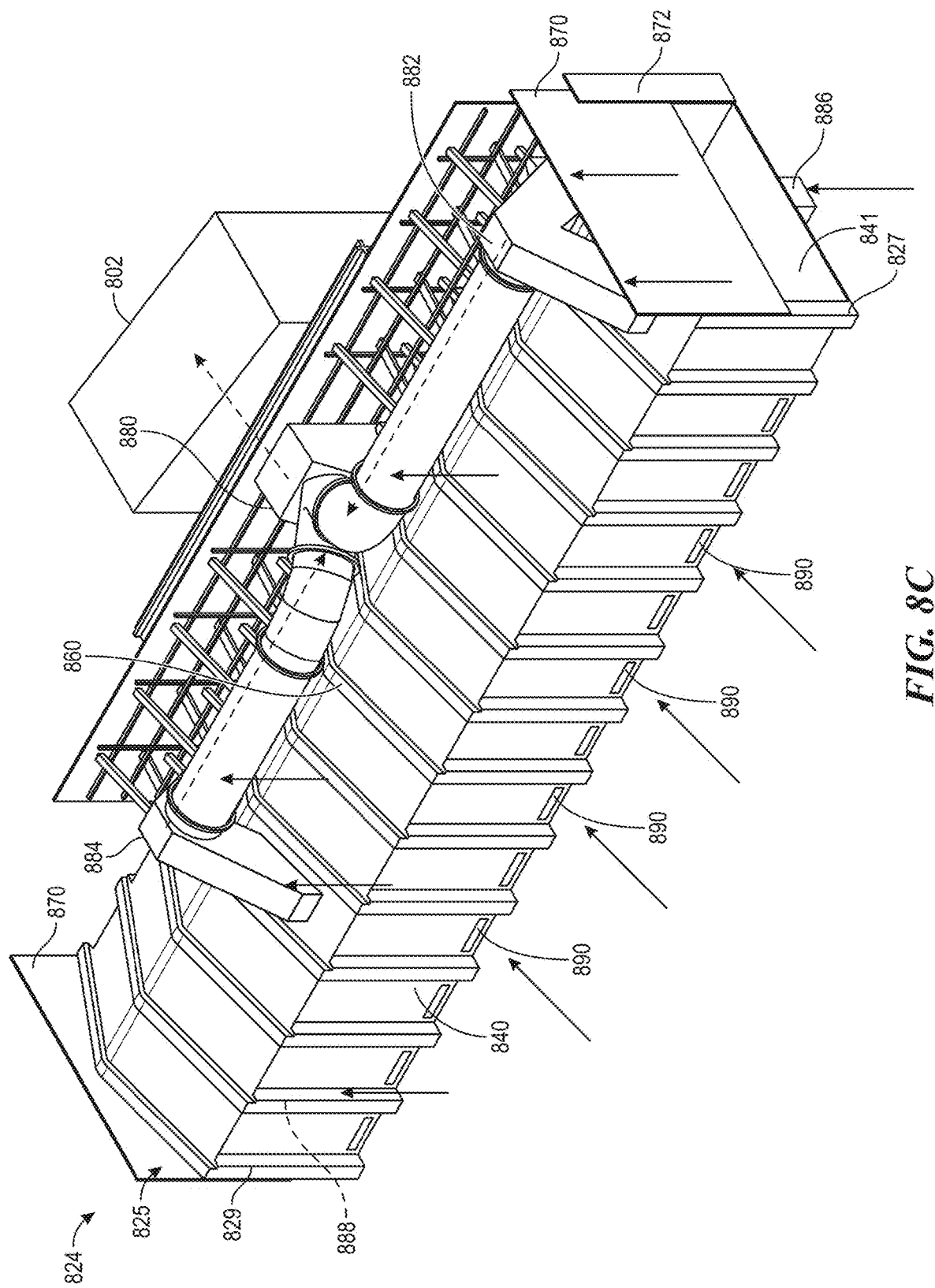
FIG. 8C illustrates fluid flow into and out of the industrial car of FIG. 8B.

FIG. 8C illustrates fluid flow into and out of the industrial car 824. As indicated by vertical arrows pointing upwards, the first, second, and third emission ducts 880, 882, 884 can be configured to draw in dust, exhaust flow, and other environmental and/or operational hazards from the interior of the hot box 825 (e.g., via a pressure differential). And as indicated by dotted arrows, the dust and exhaust flow can be mixed and then directed to the dust collector system 802. Properly removing emissions from the hot box 825 can be important for several reasons. Depending on the nature of the operation for which the industrial car 824 is used, the emissions produced can be environmental hazards if released into the environment freely. Removing the emissions can also help keep the materials less contaminated with pollutants when sent for further processing.

Similarly, the fourth and fifth emission ducts 886, 888 can be configured to direct dust and exhaust flow from underneath the hot box 825 to the dust collector system 802. More specifically, the fourth emission duct 886 can uptake dust and other substances that fall while the materials are being loaded onto the hot box 825 through the entry 827. The fifth emission duct 888 can uptake dust and other substances that fall while the materials are being removed from the hot box 825 through the exit 829.

In some embodiments, the slide doors 870 can be configured to open (via actuators or manually) when materials are being loaded onto (through the entry 827) or out of (through the exit 829), and at least partially fluidly seal the entry 827 and the exit 829 when the industrial car 824 is in operation. The slide doors 870 can help prevent emissions from exiting the hot box 825 through the entry 827 and the exit 829 such that they are directed to the first, second, and third emission ducts 880, 882, 884 instead.

The one or more air knives 872 can operate as a blower air knife configured to blow air out and/or a vacuum air knife configured to suck air, emission, and other fluids. The air knives 872 can blow or suck fluid out or in along a plane adjacent (e.g., parallel to, at) the entry 827 and/or the exit 829. The air knives 872 can advantageously reduce emission or other exhaust flow from inside the industrial car 824 to the environment.

The one or more slot openings 890 can be configured to allow air from the environment, which can be at a much lower temperature than inside the hot box 825, to enter the hot box 825 and cool the exhaust and other emissions prior to entering the dust collector system 802. Cooling the interior of the hot box 825 can reduce wear on the overall industrial car 824 (e.g., by reducing thermal expansion and contraction of components) and increase the level of overall safety of the system.

Figure 9:
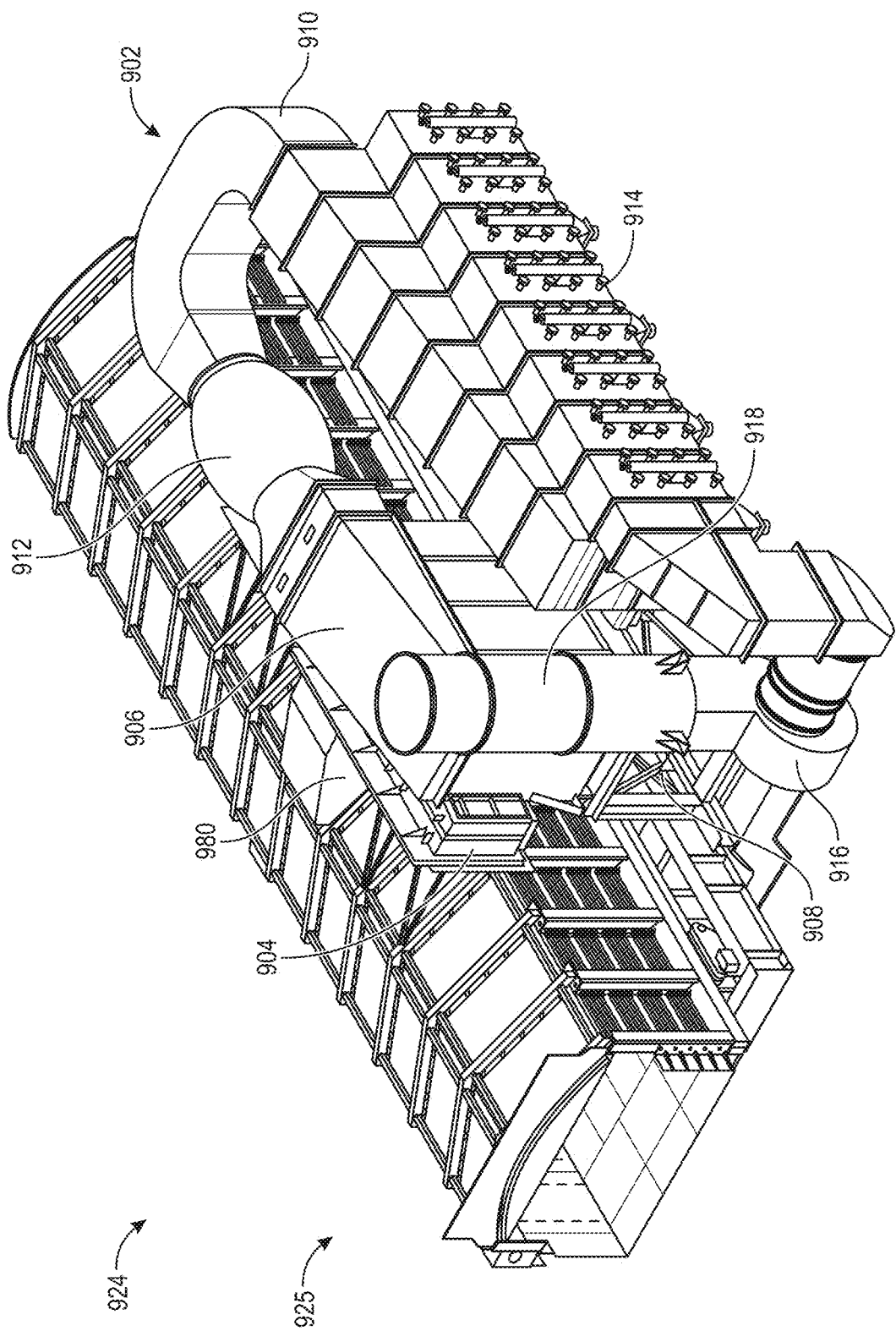
FIG. 9 is a right perspective view of an industrial car and a dust collector system in accordance with embodiments of the present technology.

FIG. 9 is a right perspective view of an industrial car 924 (e.g., the industrial car 224) and a dust collector system 902 (e.g., the dust collector system 802) in accordance with embodiments of the present technology. The industrial car 924 can include an at least partially enclosed hot box 925 (e.g., the hot box 225) with an emission duct 980 (e.g., the third emission duct 880) fluidly coupled to the interior of the hot box 925. The dust collector system 902 can include an entrance piece 904, a cyclone unit 906, hoppers 908, an exhaust duct 910, a spark arrester 912 (e.g., a quencher), a baghouse 914, a fan 916, and a chimney 918.

The cyclone unit 906 include a side header (e.g., an opening) fluidly coupled to an outlet of the hot box 925 and configured to receive emissions (e.g., hot exhaust gas) from the interior of the hot box 925. The entrance piece 904 can be coupled to the cyclone unit 906 proximate the side header, and can be designed to engage the industrial car 924 and minimize leakage of the emissions to the environment. The cyclone unit 906 can comprise multiclones, high speed cyclones, and/or other types of dust separator assemblies. The hoppers 908 can be coupled to or be integrated with the cyclone unit 906 (e.g., at a lower portion of the cyclone unit 906, as shown). The exhaust duct 910 can extend and be fluidly coupled between the cyclone unit 906 and the baghouse 914. In the illustrated embodiment, the spark arrester 912 is included along the exhaust duct 910 adjacent the cyclone unit 906. The baghouse 914 can include ceramic filters, bag filters, or other types of filters. The fan 916 can be positioned between the baghouse 914 and the chimney 918. In some embodiments, the fan 916 comprises an induced draft fan or a vacuum pump. The chimney 918 can extend vertically, as shown.

During operation of the dust collector system 902, the emission duct 980 (and optionally additional or alternative emission ducts) direct emissions from the interior of the hot box 925 to the cyclone unit 906 via the entrance piece 904. The cyclone unit 906 can be configured to filter or otherwise separate particulates from the emissions gas and collect the particulates in the hoppers 908. The exhaust duct 910 can then direct the filtered emissions (e.g., cleaner exhaust gas) towards the baghouse 914. The spark arrester 912 can be configured to extinguish embers, sparks, and/or ignited particles collected by the exhaust duct 910, as well as reduce the likelihood for ignition of particles or other matter collected by the exhaust duct 910. In some embodiments, the spark arrester 236 includes angled vanes and/or fins configured to disturb laminar low such that particles within the airflow can be accelerated and oxidant concentration can be reduced, thereby extinguishing, and/or reducing the ignition likelihood of, the particles before reaching the baghouse 914. As noted above, the baghouse 914 can include filters configured to further filter the emissions and separate dust and other particulates. The fan 907 can operate to facilitate the flow of the filtered emissions toward and out through the chimney 918.

In some embodiments, the dust collector system 902 includes HVAC units and controls to cool down the incoming emissions gas (e.g., from approximately 1000° F. to approximately 250° F.). The lowered temperature can reduce the likelihood of, for example, the baghouse 914 burning and increase the overall safety of the dust collector system 902.

The dust collector system 902 and the industrial car 924 (and/or the industrial car 824) can efficiently and effectively capture emissions produced by the industrial products in the hot box 925 with minimal leakage to the environment. For example, the dust collector system 902 can remove dust with at least 99%, 99.5%, or 99.9% efficiency. In some embodiments, the cyclone unit 906 is configured to filter the emissions such that the collected particulates are in the form of fine powder, indicating a high degree of dust removal from the emissions.

It will be appreciated that while FIG. 9 illustrates the dust collector system 902 as including the cyclone unit 906 and the baghouse 914, among other components, the dust collect system 902 can include additional or alternative dust collector components. For example, in some embodiments, the dust collector system 902 includes a sintered filter rated for high temperatures and/or an air cooler, a fin fan, and/or the like, which may be coupled to the baghouse 914 downstream. Furthermore, in some embodiments, the dust collector system 902 further includes a temperature monitoring system, a fire monitoring system, a fire suppression system, and/or the like to, e.g., prevent or reduce damage due to a potential fire at the baghouse 914 (e.g., caused by high temperature sparks reaching the baghouse 914).

Figure 10:
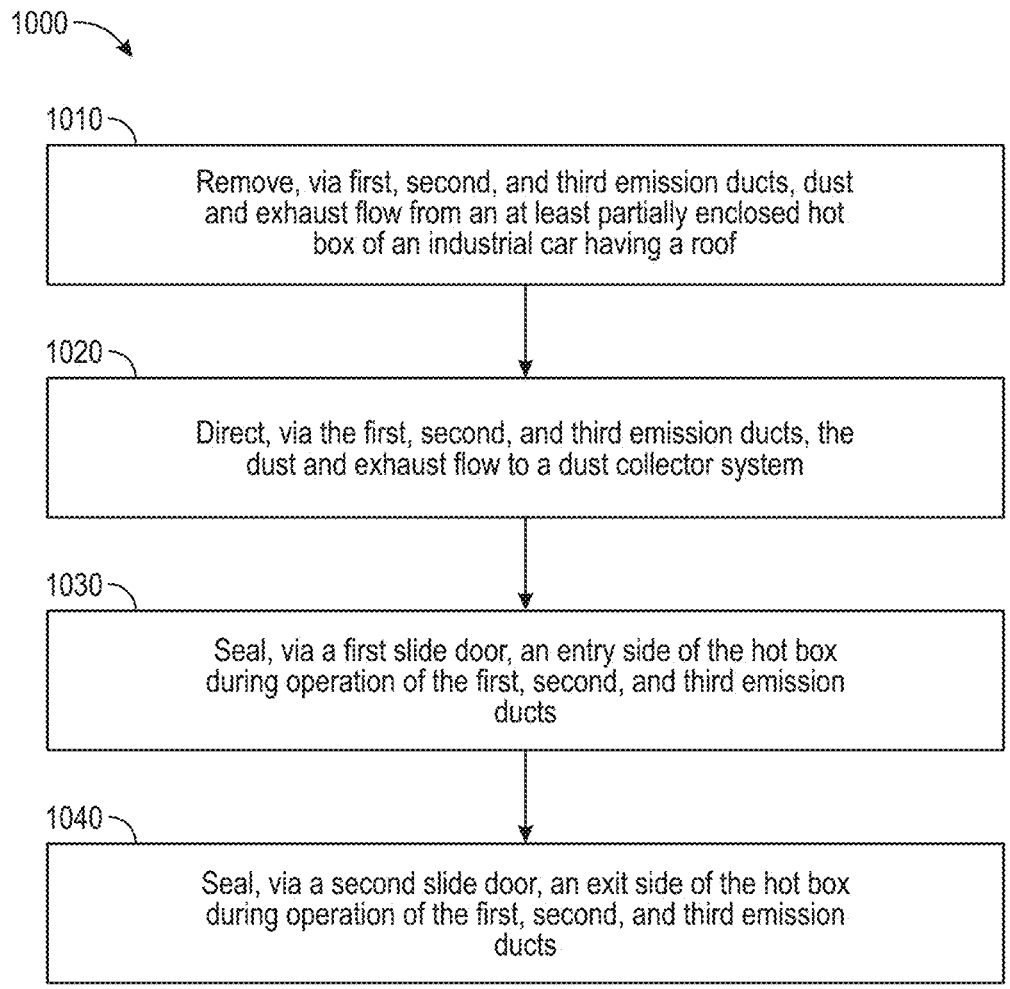
FIG. 10 is a flowchart illustrating a method of directing emission from an industrial car for use in a coke plant in accordance with embodiments of the present technology.

FIG. 10 is a flowchart illustrating a method 1000 of directing emission from an industrial car for use in a coke plant in accordance with embodiments of the present technology. The method 1000 can include removing—via first, second, and third emission ducts (e.g., the first, second, and third emission ducts 880, 882, 884)—dust and exhaust flow (and other emissions) from an at least partially enclosed hot box (e.g., the hot box 825) of an industrial car (e.g., the industrial car 824) having a roof (e.g., the roof 860) (process portion 1010). As shown in FIGS. 8A-8C, in some embodiments, the first emission duct extends from a central portion of the roof, the second emission duct extends from a first side portion of the roof, and the third emission duct extends from a second side portion of the roof. In some embodiments, the roof comprises a first non-curved member and a second non-curved member abutting the first non-curved member (e.g., as illustrated in FIGS. 8A-8C).

The method 1000 can then include directing—via the first, second, and third emission ducts—the dust and exhaust flow to a dust collector system (e.g., the dust collector system 802) (process portion 1020). The method 1000 can then include sealing, via a first slide door, an entry side (e.g., the entry 827) of the hot box during operation of the first, second, and third emission ducts (process portion 1030). The method can also include sealing, via a second slide door, an exit side (e.g., the exit 829) of the hot box during operation of the first, second, and third emission ducts (process portion 1040). As discussed above, the first and second slide doors can help prevent emissions from leaving the hot box into the environment through the entry and exit sides, and help direct the emissions to the first, second, and third emission ducts instead.

In some embodiments, the method 1000 can further include directing—via fourth and fifth emission ducts (e.g., the fourth and fifth emission ducts 886, 888)—dust and exhaust flow from underneath the hot box to the dust collector system. In some embodiments, the method 1000 can further include allowing or enabling—via one or more slot openings (e.g., the slot openings 890) airflow from the environment into the hot box. The airflow, which can be at a much lower temperature than inside the hot box, can cool the exhaust and other emissions prior to entering the dust collector system.

V. Conclusion

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below as numbered clauses (1, 2, 3, etc.) for convenience. These are provided as examples and do not limit the present technology. It is noted that any of the dependent clauses may be combined in any combination, and placed into a respective independent clause. The other clauses can be presented in a similar manner.

1. An industrial car configured to hold materials having temperatures in excess of 2000° F., the industrial car comprising:
    an at least partially enclosed hot box having a base, and a pair of opposing sidewalls each extending upward from the base;
    cross members coupled to at least one of the base or the sidewalls;
    coupling members each coupled to at least one of the cross members;
    surface plates disposed adjacent to the coupling members, wherein adjacent surface plates are spaced apart from another by at least a predetermined threshold distance, and wherein, in operation, the surface plates are movable independent from the coupling members; and
    clips coupled to the surface plates, wherein the clips are configured to keep the surface plates adjacent to the coupling members.

2. The industrial car of any one of the clauses herein, wherein, when the industrial car is heated, the coupling members remain fixed relative to the cross members.

3. The industrial car of any one of the clauses herein, wherein, when the industrial car is heated, the clips remain fixed relative to the surface plates.

4. The industrial car of any one of the clauses herein, wherein, when the industrial car is heated, the adjacent surface plates thermally expand without overlapping and independently of the coupling members.

5. The industrial car of any one of the clauses herein, wherein the surface plates are not directly coupled to the coupling members.

6. The industrial car of any one of the clauses herein, wherein the materials comprise hot coke, and wherein the industrial car comprises a flat push hot car configured to receive and hold the hot coke.

7. The industrial car of any one of the clauses herein, wherein the industrial car comprises a flat push hot car configured to receive and hold industrial products.

8. The industrial car of any one of the clauses herein, wherein the adjacent surface plates are spaced apart from one another along a first dimension, wherein the clips and the coupling members are spaced apart from one another along a second dimension that is normal to or different from the first dimension.

9. The industrial car of any one of the clauses herein, wherein the surface plates are oriented substantially parallel to the coupling members.

10. The industrial car of any one of the clauses herein, wherein, when the industrial car is heated, a dimension of individual ones of the surface plates is configured to increase by 1-2%.

11. The industrial car of any one of the clauses herein, wherein the predetermined threshold distance and/or an average clearance between individual ones of the coupling members and individual ones of the clips ranges between 0.1 inch and 0.3 inch.

12. The industrial car of any one of the clauses herein, wherein an average clearance between adjacent surface plates ranges between 0.3 inch and 0.5 inch.

13. The industrial car of any one of the clauses herein, wherein individual ones of the coupling members are welded to corresponding ones of the cross members.

14. The industrial car of any one of the clauses herein, wherein individual ones of the coupling members have a thickness that ranges between 0.5 inch and 1 inch.

15. The industrial car of any one of the clauses herein, wherein individual ones of the surface plates have a thickness that ranges between 0.8 inch and 1.2 inch.

16. The industrial car of any one of the clauses herein, wherein individual ones of the surface plates are each coupled to four of the clips.

17. The industrial car of any one of the clauses herein wherein:
   each of the cross members has a generally rectangular cross-section and extends substantially normal to the base or the sidewalls,
   each of the coupling members includes a plate coupled to, centered with, and oriented substantially perpendicular to a corresponding one of the cross members,
   each of the surface plates is disposed over at least two adjacent ones of the coupling members,
   at least two of the clips are coupled to a same one of the surface plates and positioned between two adjacent ones of the coupling members, and
   each of the clips includes a protrusion configured to be positioned in a corresponding recess of one of the surface plates.

18. An industrial car for use in a coke plant, the industrial car comprising:
   an at least partially enclosed hot box having a base and a pair of opposing sidewalls extending upward from the base, wherein each sidewall comprises:
      vertical beams extending upward from the base;
      side plates, wherein individual ones of the side plates are coupled between successive ones of the vertical beams; and
      stiffeners that are elongate and coupled to exterior surfaces of the side plates, wherein the stiffeners extend laterally over the exterior surfaces and comprise downward-sloped cover plates configured to reduce material build-up on the sidewall.

19. The industrial car of any one of the clauses herein, wherein individual ones of the vertical beams comprise hollow structural section (HSS) beams.

20. The industrial car of any one of the clauses herein wherein individual ones of the vertical beams comprise hollow structural section (HSS) beams including at least one open end.

21. The industrial car of any one of the clauses herein, wherein the hot box further includes a roof comprising:
   angled beams extending from each sidewall, wherein the angled beams are at oriented at an acute angle relative to the vertical beams.

22. The industrial car of any one of the clauses herein, wherein the hot box further includes a roof comprising:
   angled beams extending from each sidewall, wherein the angled beams extending from a first one of the sidewalls and the angled beams extending from a second one of the sidewalls join at an obtuse angle.

23. The industrial car of any one of the clauses herein, wherein the base of the hot box comprises:
   main floor beams extending in a first direction;
   cross floor beams extending in a second direction, wherein the main floor beams and the cross floor beams intersect at joints; and
   load plates coupled to individual ones of the joints.

24. The industrial car of any one of the clauses herein, wherein the base of the hot box comprises:
   main floor beams extending in a first direction;
   cross floor beams extending in a second direction, wherein the main floor beams and the cross floor beams intersect at welded joints; and
   load plates coupled to individual ones of the welded joints, wherein the load plates are configured to distribute mechanical stress at the welded joints to the main floor beams and the cross floor beams.

25. The industrial car of any one of the clauses herein, wherein the base of the hot box comprises:
   main floor beams extending in a first direction;
   cross floor beams extending in a second direction, wherein the main floor beams and the cross floor beams intersect at joints;
   load plates coupled to individual ones of the joints; and
   sloped plates coupled to the load plates, wherein the sloped plates are configured to reduce material build-up on the load plates.

26. The industrial car of any one of the clauses herein, wherein the base of the hot box comprises cross floor beams extending between the sidewalls, wherein individual ones of the cross floor beams include protrusions configured to extend into recesses of the vertical beams.

27. The industrial car of any one of the clauses herein wherein:
   individual ones of the vertical beams comprise hollow structural section (HSS) beams including at least one open end,
   the stiffeners include cover plates angled downward relative to the side plates and spaced apart from one another by no more than 12 inches, and
   the base includes:
      a plurality of main floor beams extending in a first direction,
      a plurality of cross floor beams extending in a second direction, wherein the main floor beams and the cross floor beams intersect at a plurality of welded joints, and
      a plurality of octagonal load plates coupled to corresponding ones of the welded joints, wherein the octagonal load plates are configured to distribute mechanical stress at the welded joints to the main floor beams and the cross floor beams.

28. An industrial car for use in a coke plant, the industrial car comprising:
   an at least partially enclosed hot box having a base, a pair of opposing sidewalls extending upward from the base, and a roof, wherein the roof comprises a first non-curved member and a second non-curved member abutting the first non-curved member;
   a first emission duct extending from an intermediate portion of the roof;
   a second emission duct extending from a first side portion of the roof peripheral to the intermediate portion; and
   a third emission duct extending from a second side portion of the roof peripheral to the intermediate portion, wherein the first, second, and third emission ducts are configured to direct dust and exhaust flow from the hot box to a dust collector system.

29. The industrial car of any one of the clauses herein, further comprising:
   a fourth emission duct coupled to an underside of the base adjacent an entry side of the hot box; and
   a fifth emission duct coupled to the underside of the base adjacent an exit side of the hot box,
   wherein the fourth and fifth emission ducts are configured to direct dust and exhaust flow from underneath the hot box to the dust collector system.

30. The industrial car of any one of the clauses herein, further comprising:
   a first slide door coupled to an entry side of the hot box; and
   a second slide door coupled to an exit side of the hot box,
   wherein the first and second slide doors are configured to seal the entry and exit sides, respectively, during operation of the industrial car to prevent dust and exhaust flow from exiting the hot box through the entry or exit side.

31. The industrial car of any one of the clauses herein, wherein a lower portion of each of the sidewalls includes slot openings configured to allow airflow into the hot box.

32. The industrial car of any one of the clauses herein, wherein:
   the first emission duct extends through the first non-curved member of the roof,
   the second emission duct extends through each of the first non-curved member and the second non-curved member of the roof, and extends from a first end portion of the hot box,
   the third emission duct extends through each of the first non-curved member and the second non-curved member of the roof, and extends from a portion of the roof between a second end portion opposite the first end and the first emission duct,
   each of the second emission duct and the third emission duct is configured to direct dust and exhaust flow toward the first emission duct, and
   the first emission duct is configured to direct dust and exhaust flow from the first, second, and third emission ducts to the dust collector system.

33. A method of directing emission from an industrial car for use in a coke plant, the method comprising:
   removing, via first, second, and third emission ducts, dust and exhaust flow from an at least partially enclosed hot box of the industrial car having a roof, wherein the first emission duct extends from an intermediate portion of the roof, wherein the second emission duct extends from a first side portion of the roof peripheral to the intermediate portion, wherein the third emission duct extends from a second side portion of the roof peripheral to the intermediate portion, wherein the roof comprises a first non-curved member and a second non-curved member abutting the first non-curved member; and
   directing, via the first, second, and third emission ducts, the dust and exhaust flow to a dust collector system.

34. The method of any one of the clauses herein, wherein the dust and exhaust flow from the first, second, and third emission ducts are mixed prior to being directed to the dust collector system.

35. The method of any one of the clauses herein, further comprising:
   removing, via fourth and fifth emission ducts, dust and exhaust flow from underneath the hot box, wherein the fourth emission duct is coupled to an underside of a base of the hot box adjacent an entry side of the hot box, wherein the fifth emission duct is coupled to the underside of the base adjacent an exit side of the hot box; and
   directing, via the fourth and fifth emission ducts, the dust and exhaust flow to the dust collector system.

36. The method of any one of the clauses herein, further comprising:
   sealing, via a first slide door, an entry side of the hot box during operation of the first, second, and third emission ducts; and
   sealing, via a second slide door, an exit side of the hotbox during operation of the first, second, and third emission ducts.

37. The method of any one of the clauses herein, further comprising:
   allowing, via slot openings included in lower portions of sidewalls of the hot box, airflow into the hot box, wherein the airflow is configured to cool the dust and exhaust flow removed by the first, second, and third emission ducts.

We claim:

1. An industrial car configured to hold materials having temperatures in excess of 2000° F., the industrial car comprising:
   an at least partially enclosed hot box having a base, and a pair of opposing sidewalls each extending upward from the base;
   cross members coupled to at least one of the base or the sidewalls;
   coupling members each coupled to at least one of the cross members;
   surface plates disposed adjacent to the coupling members, wherein the surface plates are configured to support materials having temperatures in excess of 2000° F. wherein adjacent surface plates are spaced apart from another by at least a predetermined threshold distance, and wherein, in operation, the surface plates are movable independent from the coupling members; and
   clips coupled to the surface plates, wherein the clips are configured to keep the surface plates adjacent to the corresponding coupling members,
   wherein the industrial car is configured to hold and transport the materials.

2. The industrial car of claim 1 wherein, when the industrial car is heated, the coupling members remain fixed relative to the cross members.

3. The industrial car of claim 1 wherein, when the industrial car is heated, the adjacent surface plates thermally expand without overlapping and independently of the coupling members.

4. The industrial car of claim 1 wherein the surface plates are not directly coupled to the coupling members.

5. The industrial car of claim 1 wherein the industrial car comprises a flat push hot car configured to receive and hold industrial products.

6. The industrial car of claim 1 wherein the adjacent surface plates are spaced apart from one another along a first dimension, wherein the clips and the coupling members are spaced apart from one another along a second dimension that is normal to or different from the first dimension.

7. The industrial car of claim 1 wherein the surface plates are oriented substantially parallel to the coupling members.

8. The industrial car of claim 1 wherein, when the industrial car is heated, a dimension of individual ones of the surface plates is configured to increase by 1-2%.

9. The industrial car of claim 1 wherein:
- each of the cross members has a generally rectangular cross-section and extends substantially normal to the base or the sidewalls,
- each of the coupling members includes a plate coupled to, centered with, and oriented substantially perpendicular to a corresponding one of the cross members, each of the surface plates is disposed over at least two adjacent ones of the coupling members,
- at least two of the clips are coupled to a same one of the surface plates and positioned between two adjacent ones of the coupling members, and
- each of the clips includes a protrusion configured to be positioned in a corresponding recess of one of the surface plates.

* * * * *

UNITED STATES PATENT AND TRADEMARK OFFICE
CERTIFICATE OF CORRECTION

| | | |
|---|---|---|
| PATENT NO. | : 12,410,369 B2 | Page 1 of 1 |
| APPLICATION NO. | : 18/954882 | |
| DATED | : September 9, 2025 | |
| INVENTOR(S) | : Chun Wai Choi et al. | |

It is certified that error appears in the above-identified patent and that said Letters Patent is hereby corrected as shown below:

On the Title Page

On Page 8, Column 1 (item (56) - Other Publications), Line 55, delete "abestos,"" and insert --asbestos,"-- therefor.
On Page 11, Column 1 (item (56) - Other Publications), Line 22, delete "wasteheat" and insert --waste heat-- therefor.

In the Specification

In Column 5, Line 58 (Detailed Description), delete "places" and insert --plates-- therefor.
In Column 6, Line 38 (Detailed Description), delete "places" and insert --plates-- therefor.
In Column 6, Line 50 (Detailed Description), delete "places" and insert --plates-- therefor.
In Column 6, Line 56 (Detailed Description), delete "surfaces" and insert --surface-- therefor.
In Column 11, Line 12 (Detailed Description), delete "880)" and insert --884)-- therefor.
In Column 12, Line 13 (Detailed Description), delete "collect" and insert --collector-- therefor.

Signed and Sealed this
Eighteenth Day of November, 2025

John A. Squires
*Director of the United States Patent and Trademark Office*